United States Patent
Chen et al.

(10) Patent No.: US 12,411,731 B2
(45) Date of Patent: Sep. 9, 2025

(54) ADAPTIVE DEVICE DATA CORRECTION WITH INCREASED MEMORY FAILURE HANDLING

(71) Applicant: Intel Corporation, Santa Clara, CA (US)

(72) Inventors: Lei Chen, Shanghai (CN); Liyang Ling, Shanghai (CN); Xiaodong Qiu, Shanghai (CN); Yong Jiang, Shanghai (CN)

( * ) Notice: Subject to any disclaimer, the term of this patent is extended or adjusted under 35 U.S.C. 154(b) by 761 days.

(21) Appl. No.: 17/544,085

(22) Filed: Dec. 7, 2021

(65) Prior Publication Data

US 2022/0091934 A1 Mar. 24, 2022

Related U.S. Application Data

(63) Continuation of application No. PCT/CN2021/132290, filed on Nov. 23, 2021.

(51) Int. Cl.
*G06F 11/10* (2006.01)
*G06F 3/06* (2006.01)
*G06F 11/07* (2006.01)

(52) U.S. Cl.
CPC ........ *G06F 11/1068* (2013.01); *G06F 3/0619* (2013.01); *G06F 3/0659* (2013.01); *G06F 3/0679* (2013.01); *G06F 11/0772* (2013.01)

(58) Field of Classification Search
CPC ............. G06F 11/1068; G06F 11/0772; G06F 3/0619; G06F 3/0659; G06F 3/0679; G06F 11/1666

USPC ......................................................... 714/819
See application file for complete search history.

(56) References Cited

U.S. PATENT DOCUMENTS

| | | | | |
|---|---|---|---|---|
| 8,769,356 B2* | 7/2014 | Yu | ........................ | G11C 29/785 |
| | | | | 714/719 |
| 2012/0173937 A1* | 7/2012 | Do | ......................... | G11C 29/48 |
| | | | | 714/719 |
| 2014/0325315 A1* | 10/2014 | Warnes | ............... | G06F 11/1008 |
| | | | | 714/767 |
| 2016/0093400 A1* | 3/2016 | Botea | ..................... | G11C 29/38 |
| | | | | 714/719 |
| 2016/0232063 A1* | 8/2016 | Das | ........................ | G06F 11/108 |

FOREIGN PATENT DOCUMENTS

WO WO-2022139849 A1 * 6/2022 .............. G06F 11/10

* cited by examiner

*Primary Examiner* — Albert Decady
*Assistant Examiner* — Enam Ahmed
(74) *Attorney, Agent, or Firm* — Haley Guiliano LLP

(57) ABSTRACT

An embodiment of an electronic apparatus may comprise one or more substrates and a controller coupled to the one or more substrates, the controller including circuitry to identify failed memory regions in a memory by a rank, bank, and device associated with the failed memory region, and provide recovery for failed memory regions in three or more banks of a first rank of the memory or three or more devices of the first rank of the memory by virtual lock step device data correction with one or more other ranks of the memory. Other embodiments are disclosed and claimed.

20 Claims, 17 Drawing Sheets

US 12,411,731 B2

ADAPTIVE DEVICE DATA CORRECTION WITH INCREASED MEMORY FAILURE HANDLING

CLAIM FOR PRIORITY

This application claims priority to International Patent Application No. PCT/CN2021/132290, filed Nov. 23, 2021 and titled "ADAPTIVE DEVICE DATA CORRECTION WITH INCREASED MEMORY FAILURE HANDLING," which is incorporated by references in its entirety for all purposes

BACKGROUND

Reliability, availability and serviceability (RAS), sometimes also referred to as reliability, availability, and maintainability (RAM), refers to computer hardware and software design features that promote robust and fault-tolerant operation for a long uptime for a computer system. With respect to memory, RAS design features may promote data integrity. Example memory RAS features include error correcting codes (ECC), memory sparing, memory mirroring, single device data correction (SDCC), SDDC plus one (SDDC+1), double device data correction (DDDC), adaptive DDDC (ADDDC), and ADDDC plus one (ADDDC+1).

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
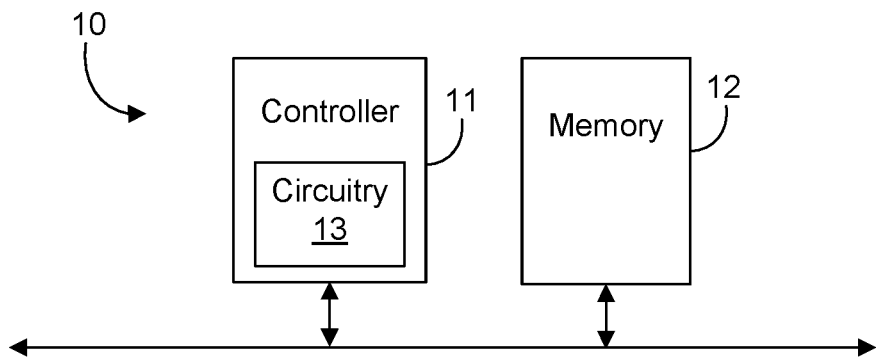
FIG. 1 is a block diagram of an example of an electronic system according to an embodiment.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, Field Programmable Gate Array (FPGA), firmware, driver, software, or any combination thereof. The material disclosed herein may also be implemented as instructions stored on a machine-readable medium, which may be read and executed by Moore Machine, Mealy Machine, and/or one or more processors. A machine-readable medium may include any medium and/or mechanism for storing or transmitting information in a form readable by a machine (e.g., a computing device). For example, a machine-readable medium may include read only memory (ROM); random access memory (RAM); Dynamic random-access memory (DRAM), magnetic disk storage media; optical storage media; NV memory devices; phase-change memory, qubit solid-state quantum memory, electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Various embodiments described herein may include a memory component and/or an interface to a memory component. Such memory components may include volatile and/or nonvolatile (NV) memory. Volatile memory may be a storage medium that requires power to maintain the state of data stored by the medium. Non-limiting examples of volatile memory may include various types of random access memory (RAM), such as dynamic RAM (DRAM) or static RAM (SRAM). One particular type of DRAM that may be used in a memory module is synchronous dynamic RAM (SDRAM). In particular embodiments, DRAM of a memory component may comply with a standard promulgated by Joint Electron Device Engineering Council (JEDEC), such as JESD79F for double data rate (DDR) SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at jedec.org). Such standards (and similar standards) may be referred to as DDR-based standards and communication interfaces of the storage devices that implement such standards may be referred to as DDR-based interfaces.

NV memory (NVM) may be a storage medium that does not require power to maintain the state of data stored by the medium. In one embodiment, the memory device may include a three dimensional (3D) crosspoint memory device, or other byte addressable write-in-place nonvolatile memory devices. In one embodiment, the memory device may be or may include memory devices that use chalcogenide glass, single or multi-level Phase Change Memory (PCM), a resistive memory, nanowire memory, ferroelectric transistor RAM (FeTRAM), anti-ferroelectric memory, magnetoresistive RAM (MRAM) memory that incorporates memristor technology, resistive memory including the metal oxide base, the oxygen vacancy base and the conductive bridge RAM (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In particular embodiments, a memory component with non-volatile memory may comply with one or more standards promulgated by the JEDEC, or other suitable standard (the JEDEC standards cited herein are available at jedec.org).

With reference to FIG. 1, an embodiment of an electronic system 10 may include a controller 11 communicatively coupled to memory 12. The memory 12 may be organized as two or more ranks, where each rank is organized as two or more banks and two or more devices (e.g., as a matrix of banks and devices). The controller 11 may include circuitry 13 to identify failed memory regions in the memory 12 by a rank, bank, and device associated with the failed memory region, and to provide recovery for failed memory regions in three or more banks of a first rank of the memory 12 or three or more devices of the first rank of the memory 12 by virtual lock step (VLS) device data correction (DDC) with one or more other ranks of the memory 12.

In some embodiments of the system 10, the circuitry 13 may be configured to provide dynamic bank VLS DDC. For example, the circuitry 13 may be configured to maintain a data structure for the dynamic bank VLS DDC that includes a field for bank group information (e.g., that may indicate two or more banks in a bank group). In some embodiments, the circuitry 13 may be further configured to determine if a third or subsequent failed memory region in the first rank is in a same device and a different non-failed bank as a previously identified failed memory region and, if so determined, identify a non-failed bank in a second rank of the memory 12 and update the data structure to add a bank of the third or subsequent failed memory region and the identified non-failed bank to the bank group information for an entry in the data structure for the previously identified failed memory region. The circuitry 13 may also be configured to determine if a third or subsequent failed memory region in the first rank is in a different device and an already failed bank as a previously identified failed memory region and, if so determined, set up DDC for the third or subsequent failed memory region in a backup memory region of both the first rank and a second rank of the memory 12, add an entry for the different device in the data structure, and update the data structure to add a bank of the third or subsequent failed memory region and a bank of the backup memory region to the bank group information for the added entry. The circuitry 13 may also be configured to determine if a third or subsequent failed memory region in the first rank is in a different device and non-failed bank as a previously identified failed memory region and, if so determined, identify a non-failed bank in a second rank of the memory 12, add an entry for the different device in the data structure, and update the data structure to add a bank of the third or subsequent failed memory region and the identified non-failed bank to the bank group information for the added entry.

In some embodiments, the circuitry 13 may be additionally or alternatively configured to provide adaptive multiple DDC for failed memory regions in four or more devices of the first rank of the memory 12 by VLS with one or more other ranks of the memory 12. In some cases, the failed memory regions may correspond to a same bank of the four or more devices. For example, the circuitry 13 may be configured to maintain a data structure for the adaptive multiple DDC that includes fields that indicate failed rank information and non-failed rank information. In some embodiments, the circuitry 13 may be further configured to determine if a clean bank is available for a bank-level VLS DDC and if the data structure can support an entry for DDC for a fourth or subsequent failed memory region and, if so determined, add an entry for the failed memory region in the data structure and update the data structure to indicate a failed rank, failed bank, and failed device of the fourth or subsequent failed memory region and a non-failed rank and non-failed bank of the clean bank. The circuitry 13 may also be configured to determine if a clean rank is available for a rank-level VLS DDC and if the data structure can support an entry for DDC for a fourth or subsequent failed memory region and, if so determined, add an entry for the failed memory region in the data structure and update the data structure to indicate a failed rank and failed device of the fourth or subsequent failed memory region and a non-failed rank of the clean rank.

Embodiments of the controller 11 may include a general purpose controller, a special purpose controller, a memory controller, a storage controller, a micro-controller, an execution unit, etc. In some embodiments, the memory 12, the circuitry 13, and/or other system memory may be located in, or co-located with, various components, including the controller 11 (e.g., on a same die or package substrate). For example, the controller 11 may be configured as a memory controller and the memory 12 may be a connected memory device such as DRAM, NVM, a solid-state drive (SSD), a storage node, etc. Embodiments of each of the above controller 11, memory 12, circuitry 13, and other system components may be implemented in hardware, software, or any suitable combination thereof. For example, hardware implementations may include configurable logic, fixed-function-ality logic, or any combination thereof. Examples of configurable logic include suitably configured programmable logic arrays (PLAs), FPGAs, complex programmable logic devices (CPLDs), and general purpose microprocessors. Examples of fixed-functionality logic include suitably configured application specific integrated circuits (ASICs), combinational logic circuits, and sequential logic circuits. The configurable or fixed-functionality logic can be implemented with complementary metal oxide semiconductor (CMOS) logic circuits, transistor-transistor logic (TTL) logic circuits, or other circuits.

Alternatively, or additionally, all or portions of these components may be implemented in one or more modules as a set of logic instructions stored in a machine- or computer-readable storage medium such as RAM, ROM, programmable ROM (PROM), firmware, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C#, VHDL, Verilog, System C or the like and conventional procedural programming languages, such as the "C" programming language or similar programming languages. For example, the memory 12, persistent storage media, or other system memory may store a set of instructions (e.g., which may be firmware instructions) which when executed by the controller 11 cause the system 10 to implement one or more components, features, or aspects of the system 10 (e.g., identifying the failed memory regions, providing recovery for three or more failed banks or devices of a rank by VLS DDC with one or more other ranks, etc.).

Figure 2:
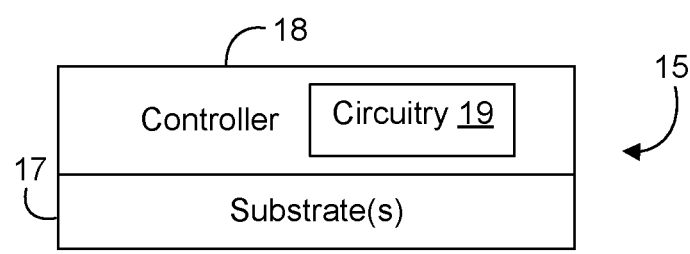
FIG. 2 is a block diagram of an example of an electronic apparatus according to an embodiment.

With reference to FIG. 2, an embodiment of an electronic apparatus 15 may include one or more substrates 17, and a controller 18 coupled to the one or more substrates 17. The controller 18 may include circuitry 19 to identify failed memory regions in a memory by a rank, bank, and device associated with the failed memory region, and to provide recovery for failed memory regions in three or more banks of a first rank of the memory or three or more devices of the first rank of the memory by VLS DDC with one or more other ranks of the memory.

In some embodiments, the circuitry 19 may be configured to provide dynamic bank VLS DDC. For example, the circuitry 19 may be configured to maintain a data structure for the dynamic bank VLS DDC that includes a field for bank group information. In some embodiments, the circuitry 19 may be further configured to determine if a third or subsequent failed memory region in the first rank is in a same device and a different non-failed bank as a previously identified failed memory region and, if so determined identify a non-failed bank in a second rank of the memory and update the data structure to add a bank of the third or subsequent failed memory region and the identified non-failed bank to the bank group information for an entry in the data structure for the previously identified failed memory region. The circuitry 19 may also be configured to determine if a third or subsequent failed memory region in the first rank is in a different device and an already failed bank as a previously identified failed memory region and, if so determined, set up DDC for the third or subsequent failed memory region in a backup memory region of both the first rank and a second rank of the memory, add an entry for the different device in the data structure, and update the data structure to add a bank of the third or subsequent failed memory region and a bank of the backup memory region to the bank group information for the added entry. The circuitry 19 may also be configured to determine if a third or subsequent failed memory region in the first rank is in a different device and non-failed bank as a previously identified failed memory region and, if so determined, identify a non-failed bank in a second rank of the memory, add an entry for the different device in the data structure, and update the data structure to add a bank of the third or subsequent failed memory region and the identified non-failed bank to the bank group information for the added entry.

In some embodiments, the circuitry 19 may be additionally or alternatively configured to provide adaptive multiple DDC for failed memory regions in four or more devices of the first rank of the memory by VLS with one or more other ranks of the memory. In some cases, the failed memory regions may correspond to a same bank of the four or more devices. For example, the circuitry 19 may be further configured to maintain a data structure for the adaptive multiple DDC that includes fields that indicate failed rank information and non-failed rank information. In some embodiments, the circuitry 19 may be configured to determine if a clean bank is available for a bank-level VLS DDC and if the data structure can support an entry for DDC for a fourth or subsequent failed memory region and, if so determined, add an entry for the failed memory region in the data structure and update the data structure to indicate a failed rank, failed bank, and failed device of the fourth or subsequent failed memory region and a non-failed rank and non-failed bank of the clean bank. The circuitry 19 may also be configured to determine if a clean rank is available for a rank-level VLS DDC and if the data structure can support an entry for a fourth or subsequent failed memory region and, if so determined, add an entry for the failed memory region in the data structure and update the data structure to indicate a failed rank and failed device of the fourth or subsequent failed memory region and a non-failed rank of the clean rank.

For example, the controller 18 may be configured as a memory controller. For example, the memory may be a connected memory device (e.g., DRAM, NVM, SSD, a storage node, etc.). Embodiments of the circuitry 19 may be implemented in a system, apparatus, computer, device, etc., for example, such as those described herein. More particularly, hardware implementations may include configurable logic (e.g., suitably configured PLAs, FPGAs, CPLDs, general purpose microprocessors, etc.), fixed-functionality logic (e.g., suitably configured ASICs, combinational logic circuits, sequential logic circuits, etc.), or any combination thereof. Alternatively, or additionally, the circuitry 19 may be implemented in one or more modules as a set of logic instructions stored in a machine- or computer-readable storage medium such as RAM, ROM, PROM, firmware, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C#, VHDL, Verilog, System C or the like and conventional procedural programming languages, such as the "C" programming language or similar programming languages.

For example, the circuitry 19 may be implemented on a semiconductor apparatus, which may include the one or more substrates 17, with the circuitry 19 coupled to the one or more substrates 17. In some embodiments, the circuitry 19 may be at least partly implemented in one or more of configurable logic and fixed-functionality hardware logic on semiconductor substrate(s) (e.g., silicon, sapphire, gallium-arsenide, etc.). For example, the circuitry 19 may include a transistor array and/or other integrated circuit components coupled to the substrate(s) 17 with transistor channel regions that are positioned within the substrate(s) 17. The interface between the circuitry 19 and the substrate(s) 17 may not be an abrupt junction. The circuitry 19 may also be considered to include an epitaxial layer that is grown on an initial wafer of the substrate(s) 17.

Figure 3A:
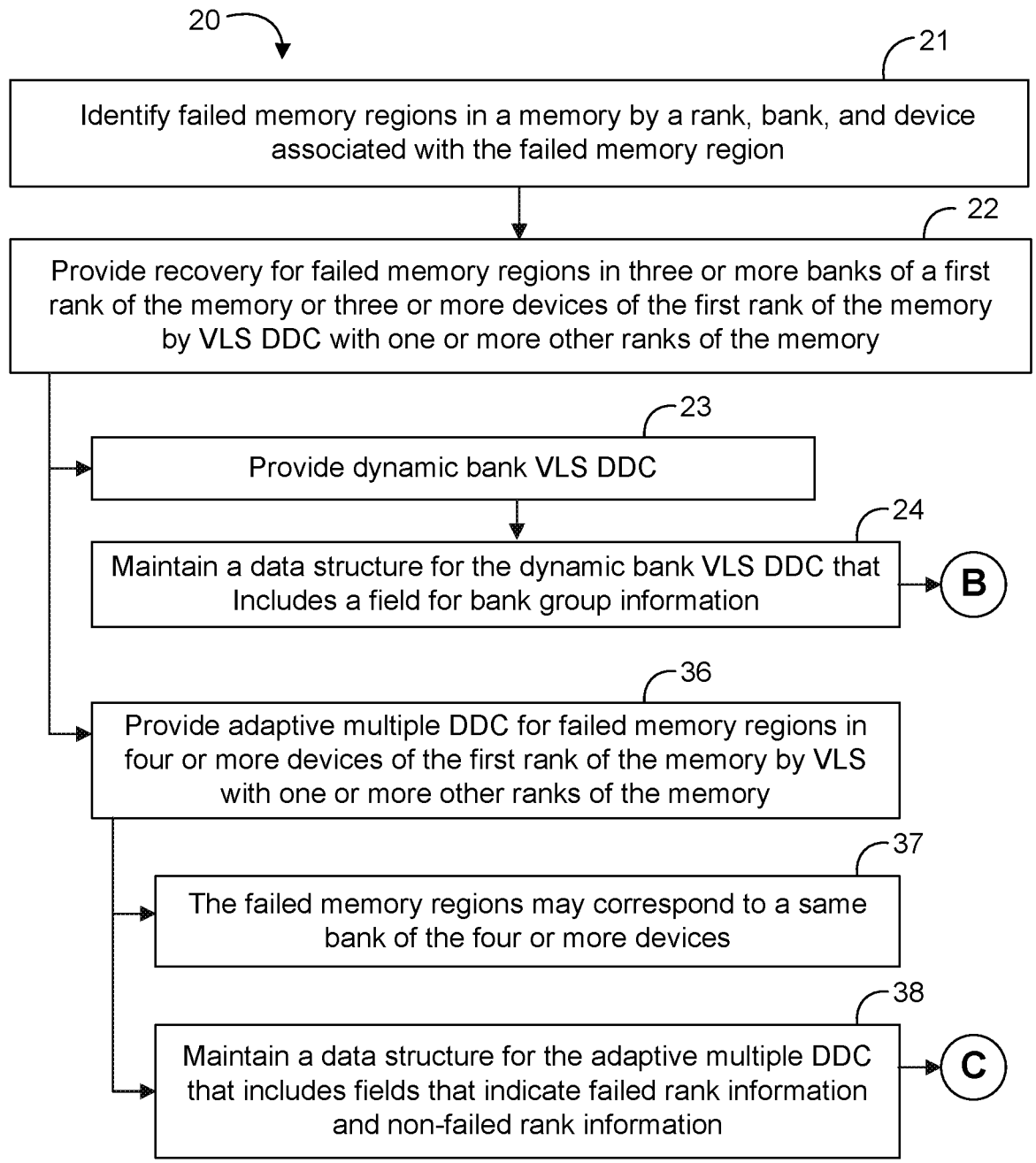
FIGS. 3A to 3C is a flowchart of an example of a method according to an embodiment.
Figure 3B:
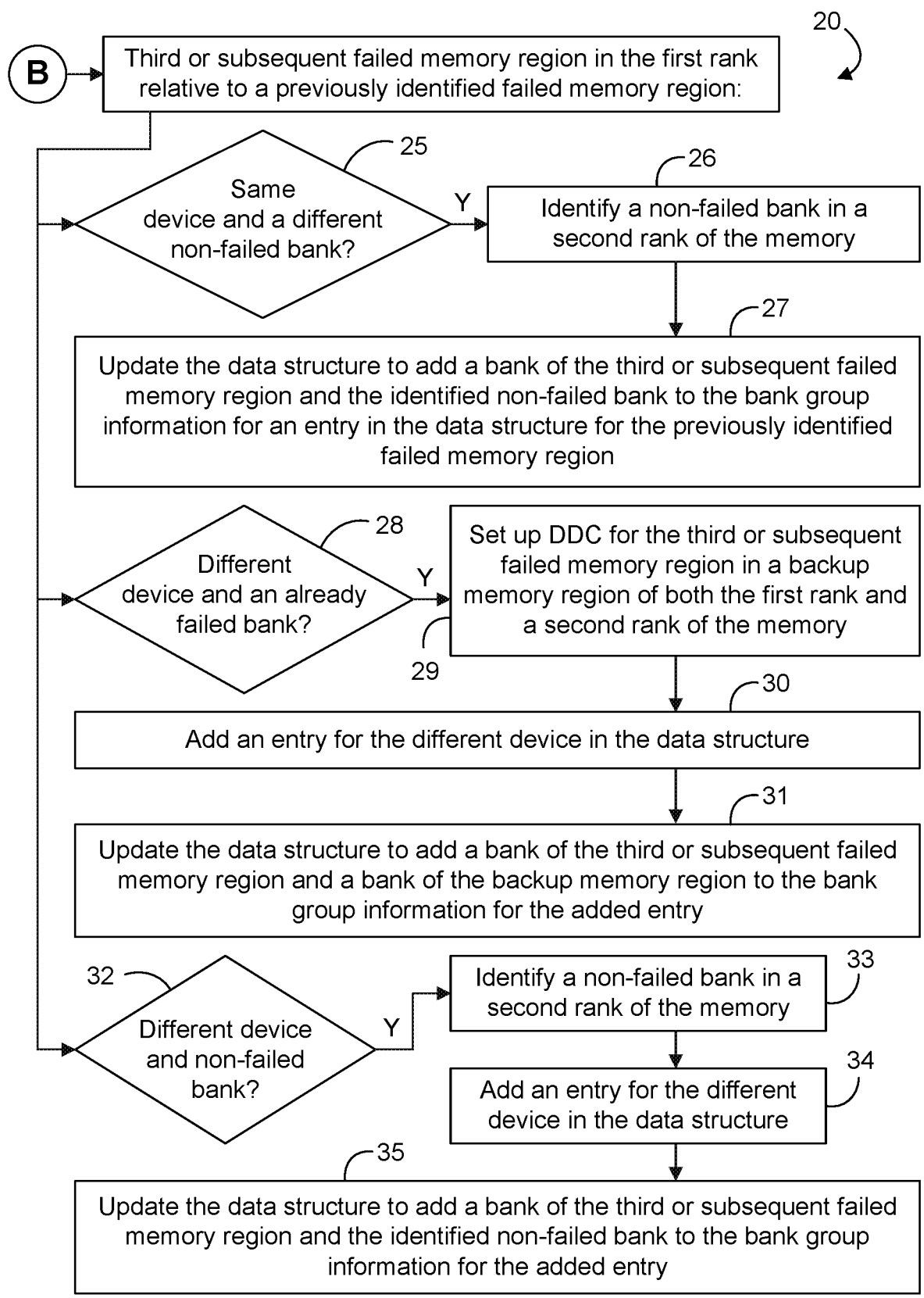
Figure 3C:
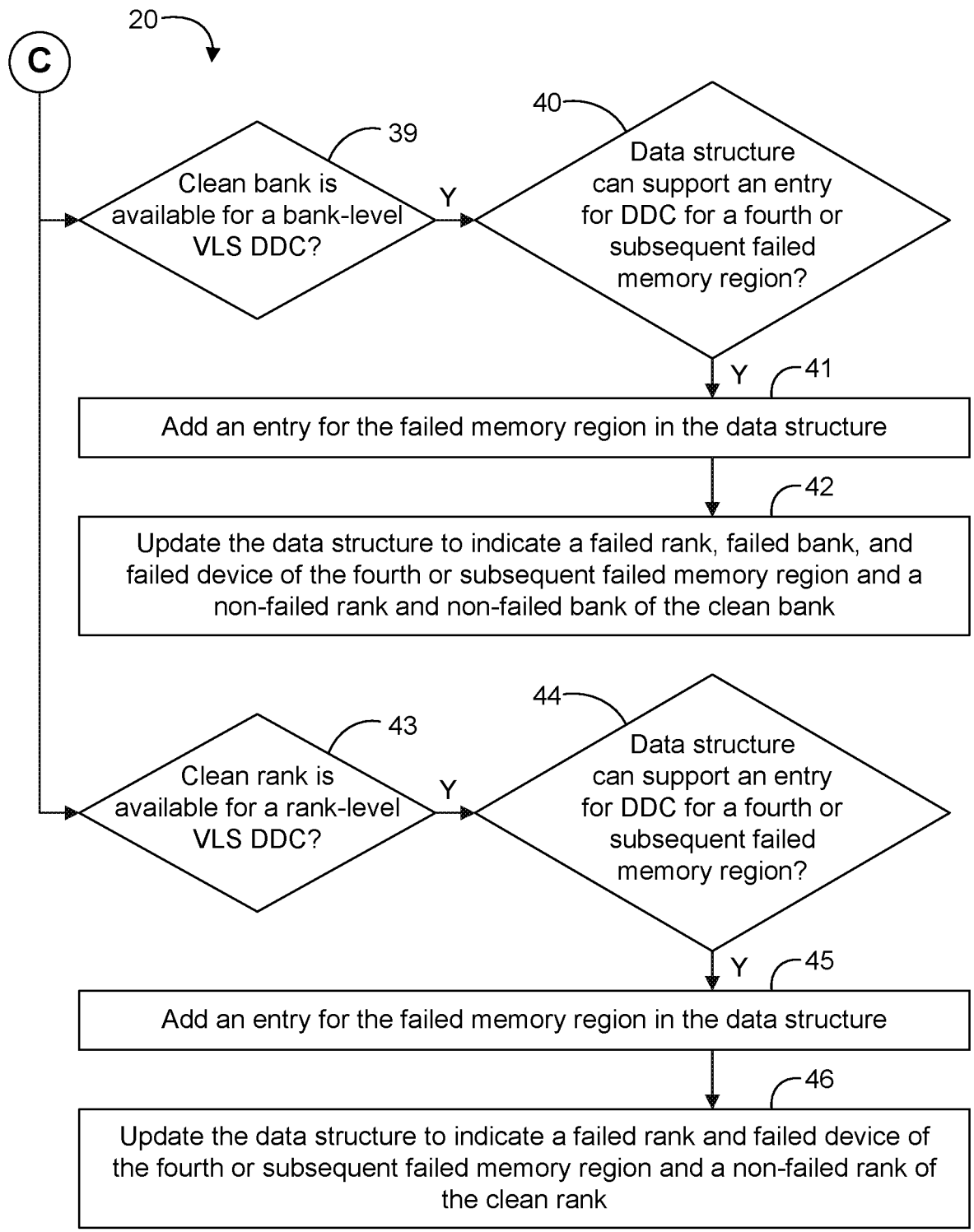

Turning now to FIGS. 3A to 3C, an embodiment of a method 20 may include identifying failed memory regions in a memory by a rank, bank, and device associated with the failed memory region at block 21, and providing recovery for failed memory regions in three or more banks of a first rank of the memory or three or more devices of the first rank of the memory by VLS DDC with one or more other ranks of the memory at block 22.

In some embodiments, the method 20 may further include providing dynamic bank VLS DDC at block 23. For example, the method 20 may include maintaining a data structure for the dynamic bank VLS DDC that includes a field for bank group information at block 24. Some embodiments of the method 20 may further include determining if a third or subsequent failed memory region in the first rank is in a same device and a different non-failed bank as a previously identified failed memory region at block 25, and, if so determined, identifying a non-failed bank in a second rank of the memory at block 26, and updating the data structure to add a bank of the third or subsequent failed memory region and the identified non-failed bank to the bank group information for an entry in the data structure for the previously identified failed memory region at block 27. The method 20 may also include determining if a third or subsequent failed memory region in the first rank is in a different device and an already failed bank as a previously identified failed memory region at block 28, and, if so determined, setting up DDC for the third or subsequent failed memory region in a backup memory region of both the first rank and a second rank of the memory at block 29, adding an entry for the different device in the data structure at block 30, and updating the data structure to add a bank of the third or subsequent failed memory region and a bank of the backup memory region to the bank group information for the added entry at block 31. The method 20 may also include determining if a third or subsequent failed memory region in the first rank is in a different device and non-failed bank as a previously identified failed memory region at block 32, and, if so determined, identifying a non-failed bank in a second rank of the memory at block 33, adding an entry for the different device in the data structure at block 34, and updating the data structure to add a bank of the third or subsequent failed memory region and the identified non-failed bank to the bank group information for the added entry at block 35.

In some embodiments, the method 20 may further include providing adaptive multiple DDC for failed memory regions in four or more devices of the first rank of the memory by VLS with one or more other ranks of the memory at block 36. In some cases, the failed memory regions may correspond to a same bank of the four or more devices at block 37. For example, the method 20 may include maintaining a data structure for the adaptive multiple DDC that includes fields that indicate failed rank information and non-failed rank information at block 38. Some embodiments of the method 20 may further include determining if a clean bank is available for a bank-level VLS DDC at block 39 and if the data structure can support an entry for DDC for a fourth or subsequent failed memory region at block 40 and, if so determined, adding an entry for the failed memory region in the data structure at block 41, and updating the data structure to indicate a failed rank, failed bank, and failed device of the fourth or subsequent failed memory region and a non-failed rank and non-failed bank of the clean bank at block 42. The method 20 may also include determining if a clean rank is available for a rank-level VLS DDC at block 43 and if the data structure can support an entry for DDC for a fourth or subsequent failed memory region at block 44 and, if so determined, adding an entry for the failed memory region in the data structure at block 45, and updating the data structure to indicate a failed rank and failed device of the fourth or subsequent failed memory region and a non-failed rank of the clean rank at block 46.

Embodiments of the method 20 may be implemented in a system, apparatus, computer, device, etc., for example, such as those described herein. More particularly, hardware implementations may include configurable logic (e.g., suitably configured PLAs, FPGAs, CPLDs, general purpose microprocessors, etc.), fixed-functionality logic (e.g., suitably configured ASICs, combinational logic circuits, sequential logic circuits, etc.), or any combination thereof. Hybrid hardware implementations include static dynamic System-on-Chip (SoC) re-configurable devices such that control flow, and data paths implement logic for the functionality. Alternatively, or additionally, the method 20 may be implemented in one or more modules as a set of logic instructions stored in a machine- or computer-readable storage medium such as RAM, ROM, PROM, firmware, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C#, VHDL, Verilog, System C or the like and conventional procedural programming languages, such as the "C" programming language or similar programming languages.

For example, the method 20 may be implemented on a computer readable medium. Embodiments or portions of the method 20 may be implemented in firmware, applications (e.g., through an application programming interface (API)), or driver software running on an OS. Additionally, logic instructions might include assembler instructions, instruction set architecture (ISA) instructions, data set architecture (DSA) commands, (machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, Moore Machine, Mealy Machine, etc.).

Dynamic Bank VLS DDC Examples

Some embodiments may advantageously provide technology for dynamic bank VLS techniques in adaptive double device data correction. Adaptive double device data correction (ADDDC) refers to a feature in some memory controllers for reliability, availability, and serviceability (RAS). Implementations of ADDDC may replace a failed region in memory with a backup memory region in an error-correcting code (ECC) device (e.g., device D17 as described below). For example, a memory module may be divided into ranks (A1, A2, . . . ), banks (B0, B1, . . . B7), and devices (D0, D1, . . . D17). A region in memory may be identified according to its rank, bank, and device designation.

When a memory region fails (e.g., rank A1, bank B0, device D0), a memory controller with ADDDC features will find a non-failed buddy region (e.g., rank A2, bank B0). The bandage of two banks may be referred to as bank-level VLS.

After the two banks are bandaged, data that used to be written to rank A1, bank B0, device D0 will be written into rank A1, bank B0, device D17, and rank A2, bank B0, device 17. The failed region is no longer used in the memory. Table 1 shows an example of how a region register may store the VLS information after an initial memory region failure with fields for the failed rank (set to a value of A1), failed bank (set to a value of B0), failed device (set to a value of D0), non-failed buddy rank (set to a value of A2), non-failed buddy bank (set to a value of B0), and VLS level (set to a value of 'bank').

TABLE 1

| FIELD | VALUE |
| --- | --- |
| Region register | 0 |
| Failed rank | A1 |
| Failed bank | B0 |
| Failed device | D0 |
| Non-failed rank | A2 |
| Non-failed bank | B0 |
| VLS level | bank |

When a second memory failure happens in the same failed device (e.g., if a memory region with rank A1, bank B2, device D0 fail), conventional ADDDC may trigger a bank to rank VLS, that does not consume an additional region register. Table 2 shows an example of region register information after two bank failures in the same device of a rank. When rank-level VLS is set in the register, ADDDC utilizes the rank ID and the bank information in the register is treated as "don't care" or not applicable (n/a).

TABLE 2

| FIELD | VALUE |
| --- | --- |
| Region register | 0 |
| Failed rank | A1 |
| Failed bank | n/a |
| Failed device | D0 |
| Non-failed rank | A2 |
| Non-failed bank | n/a |
| VLS level | rank |

When a second memory failure happens in the same failed device (e.g., if a memory region with rank A1, bank B2, device D0 fail), another option is that conventional ADDDC may trigger another bank to bank VLS, that consumes an additional region register. Table 3 shows an example of region register information after two bank failures in the same device of a rank with two region registers and bank-level VLS.

TABLE 3

| FIELD | VALUE | VALUE |
| --- | --- | --- |
| Region register | 0 | 1 |
| Failed rank | A1 | A1 |
| Failed bank | B0 | B2 |
| Failed device | D0 | D0 |
| Non-failed rank | A2 | A2 |
| Non-failed bank | B0 | B1 |
| VLS level | bank | bank |

As shown in Table 3, two pairs of VLS are constructed and two region registers are occupied. For either the example of Table 2 or Table 3, any further failure of a memory region will trigger a subsequent bank to rank VLS.

For conventional ADDDC, a third memory region failure in any bank or device in the rank will trigger single device data correction (SDDC), or ADDDC+1 in some systems. If the third failure happens in bank B4, rank A1, device D4, for example, the device D4 data will also be written into device D17 of rank A1 and A2 and all of device D17 in both ranks are fully occupied. Table 4 shows an example of region register information after two device failures in the same rank with two region registers and rank-level VLS.

TABLE 4

| FIELD | VALUE | VALUE |
| --- | --- | --- |
| Region register | 0 | 1 |
| Failed rank | A1 | A1 |
| Failed bank | n/a | n/a |
| Failed device | D0 | D4 |
| Non-failed rank | A2 | A2 |
| Non-failed bank | n/a | n/a |
| VLS level | rank | rank |

Thereafter, rank A1 cannot suffer another failure because there is no backup memory space. Any further memory region failure will result in a system call that indicates a memory error. One problem with conventional ADDDC's use of bank-to-rank VLS is that such operation removes all bank regions in a device even though there are only two failed bank regions. Many bank-device regions in good condition are mapped out. Another problem is that the bank-to-rank VLS occupies half of the device D17 in both ranks A1 and A2 after a first failure and then all of the device D17 in both ranks A1 and A2 after a second failure. Having all of the device D17 occupied for VLS reduces the memory error-correcting performance because D17 would otherwise be used to store ECC information, and reduction of the error-correcting performance runs counter to RAS principles. Another problem is that conventional ADDDC may not be flexible because the region register only divides the VLS level into bank-level and rank-level. Some embodiments provide technology to overcome one or more of the foregoing problems.

Some embodiments may utilize a different data structure for the region register to provide a dynamic bank VLS in ADDDC, and the system may advantageously handle more memory failures. For example, some embodiments may modify the region register by adding bank group information for dynamic bank VLS. Dynamic bank VLS may correspond to where VLS is operated on several bandaged banks when failures happen in a failed device, and a region register is used to store bank identifications (IDs) of the bank group or bandaged banks. Advantageously, some embodiments may improve the reliability, availability, and serviceability of a server platform, reduce a number of times a server may crash, and reduce downtime cost for server users.

Figure 4:
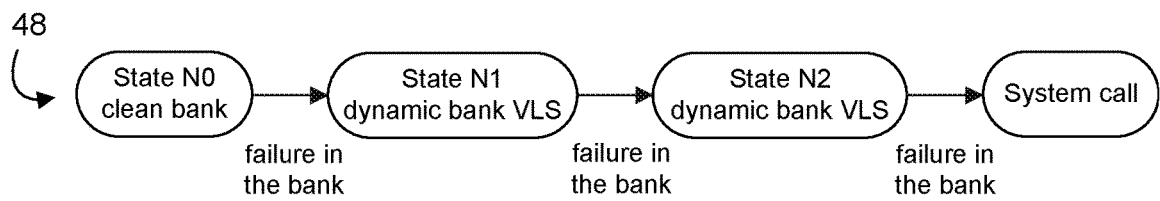
FIG. 4 is an illustrative diagram of an example of a state diagram according to an embodiment.

With reference to FIG. 4, an embodiment of a state diagram 48 illustrates an example implementation of a dynamic bank VLS technique. In some embodiments, the region register drops the VLS level field (e.g., there is no rank-level VLS) and replaces the respective bank fields with bank group fields to store bank IDs (e.g., a failed bank group field that indicates one or more failed banks in the group, and a non-failed bank group field that indicates one or more non-failed buddy banks). As shown in FIG. 4, a bank may move through three different states in the state diagram 48, nominally referred to as states N0, N1, and N2. Banks start in state N0. State N0 indicates a clean bank. After a failure in the bank, the bank moves to state N1. State N1 indicates that the bank is in a dynamic bank VLS region. After another failure in the bank, the bank moves to state N2. State N2 indicates that the bank is in two dynamic bank VLS regions. If there is another failure in the bank after state N2, a system call may be generated for error handling. For embodiments of ADDDC with dynamic bank VLS, the flow of the state diagram 48 is focused on bank but not a rank.

Figure 5:
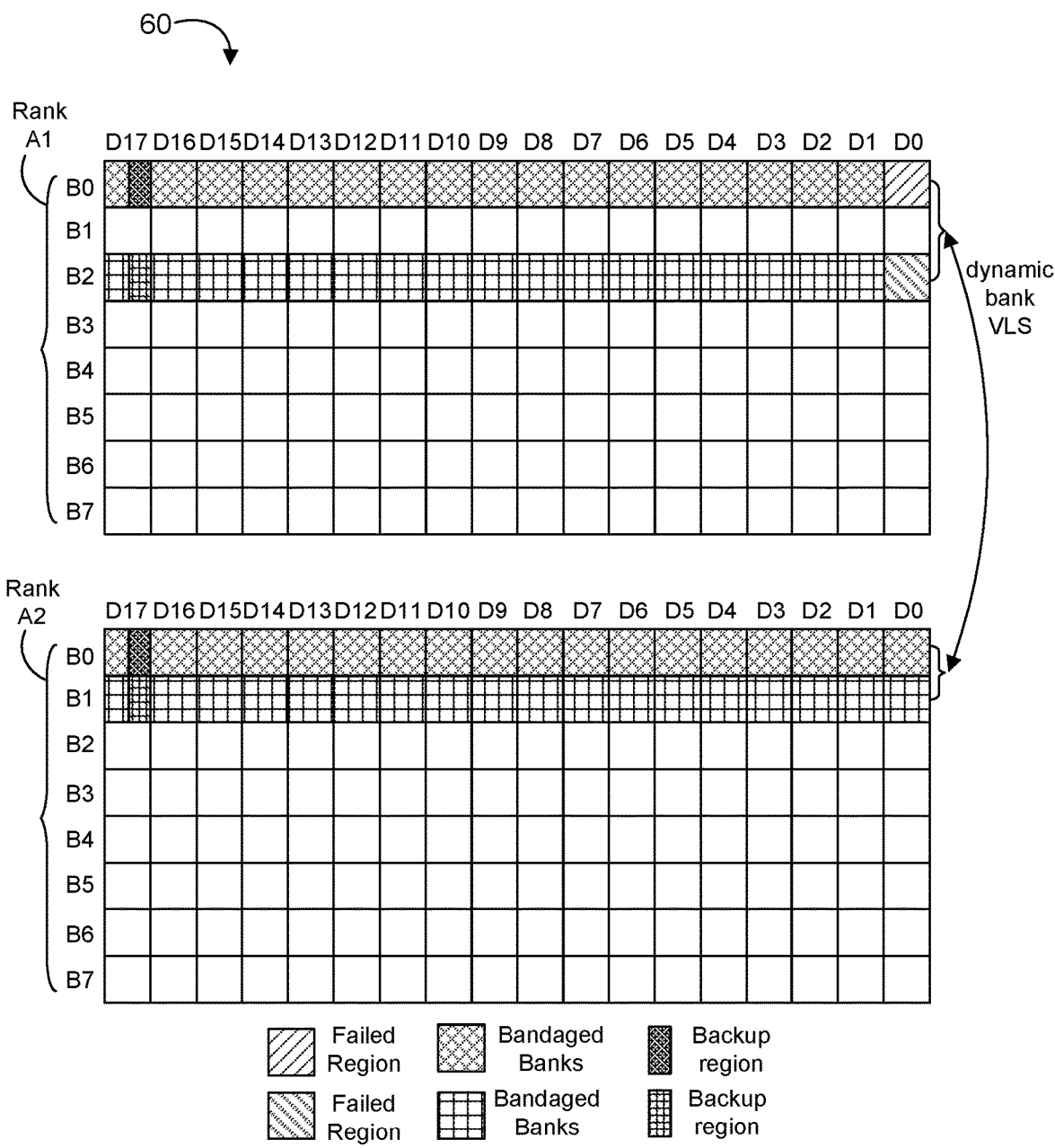
FIGS. 5 to 8 are illustrative diagrams of examples of a memory with dynamic bank virtual lock step according to an embodiment.

With reference to FIG. 5, an embodiment of a memory 60 illustrates an example implementation of a dynamic bank VLS technique. The memory 60 may correspond to a memory module (e.g., a DIMM, a SSD, etc.) that is divided into ranks (A1 and A2), banks (B0, B1, . . . B7), and devices (D0, D1, . . . D17). A region in the memory 60 may be identified according to its rank, bank, and device designation. In an example illustrated in FIG. 5, a first memory failure happens in bank B0, rank A1, device D0. An embodiment of a memory controller identifies a non-failed bank B0 in the non-failed buddy rank A2 and bandages the two banks together for VLS, with portions of the backup memory devices D17 in each rank providing backup regions for the failed memory region. The memory controller consumes a first region register and updates the appropriate values in the fields as shown in Table 5.

TABLE 5

| FIELD | VALUE |
| --- | --- |
| Region register | 0 |
| Failed rank | A1 |
| Failed bank group | B0 |
| Failed device | D0 |
| Non-failed rank | A2 |
| Non-failed bank group | B0 |

A second memory failure then happens in bank B2, rank A1, device D0. In this example, the second failure happens in the same device and different non-failed bank as the first failure. An embodiment of a memory controller constructs bank B0 and B2 in rank A1 as a failed bank group. The memory controller identifies a group of non-failed banks, that are the same number of failed banks, in a non-failed buddy rank (e.g., bank B0 and B1 in rank A2 in the illustrated example). The VLS associations are only constructed under a bank group level, indicated as a dynamic bank VLS. The memory controller then updates a corresponding region register to list the bank IDs in the appropriate bank groups as shown in Table 6. In this example, banks B0 and B2 are in state N1 because they are recorded in region register with one device failed.

TABLE 6

| FIELD | VALUE |
| --- | --- |
| Region register | 0 |
| Failed rank | A1 |
| Failed bank group | B0, B2 |
| Failed device | D0 |
| Non-failed rank | A2 |
| Non-failed bank group | B0, B1 |

For a third memory failure, embodiments may provide more flexible operation for handling the memory failure because the region register data structure includes the bank group fields. For example, if the third failure is triggered, three different example operations include 1) where the third failure is in the same device and different non-failed bank as a previous failure; 2) where the third failure is in a different device and already failed bank as a previous failure; and 3) where the third failure is in a different device and non-failed bank as a previous failure.

Figure 6:
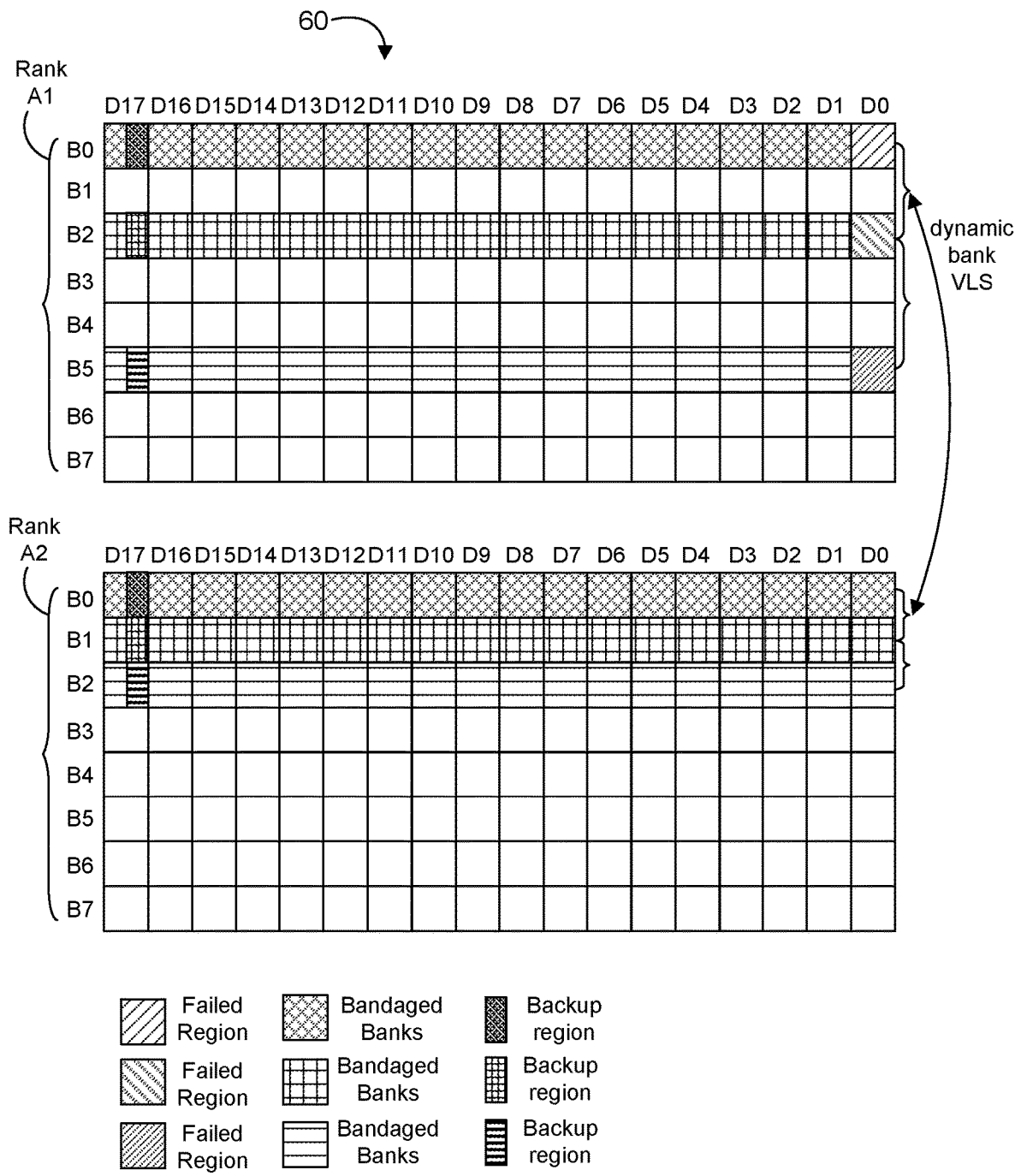

With reference to FIG. 6, a third failure happens in bank B5, rank A1, device D0 of the memory 60 (e.g., the third failure is in the same device and different non-failed bank as a previous failure). The memory controller identifies a non-failed bank B2 in the non-failed buddy rank A2 and bandages the two banks together for VLS, with portions of the backup memory devices D17 in each rank providing backup regions for the failed memory region. The newly bandaged banks are added to the existing bank groups for dynamic bank VLS by updating the data structure for the region register to include the failed bank B5 and the non-failed bank B2 in the non-failed buddy rank A2 (e.g., the newly bandaged banks are in the same dynamic bank VLS, not a new bank VLS). Table 7 shows the updated region register that adds newly failed bank B5 and non-failed bank B2 to the respective bank groups. The state for rank A1, bank B5 changes to state N1.

TABLE 7

| FIELD | VALUE |
| --- | --- |
| Region register | 0 |
| Failed rank | A1 |
| Failed bank group | B0, B2, B5 |
| Failed device | D0 |
| Non-failed rank | A2 |
| Non-failed bank group | B0, B1, B2 |

Figure 7:
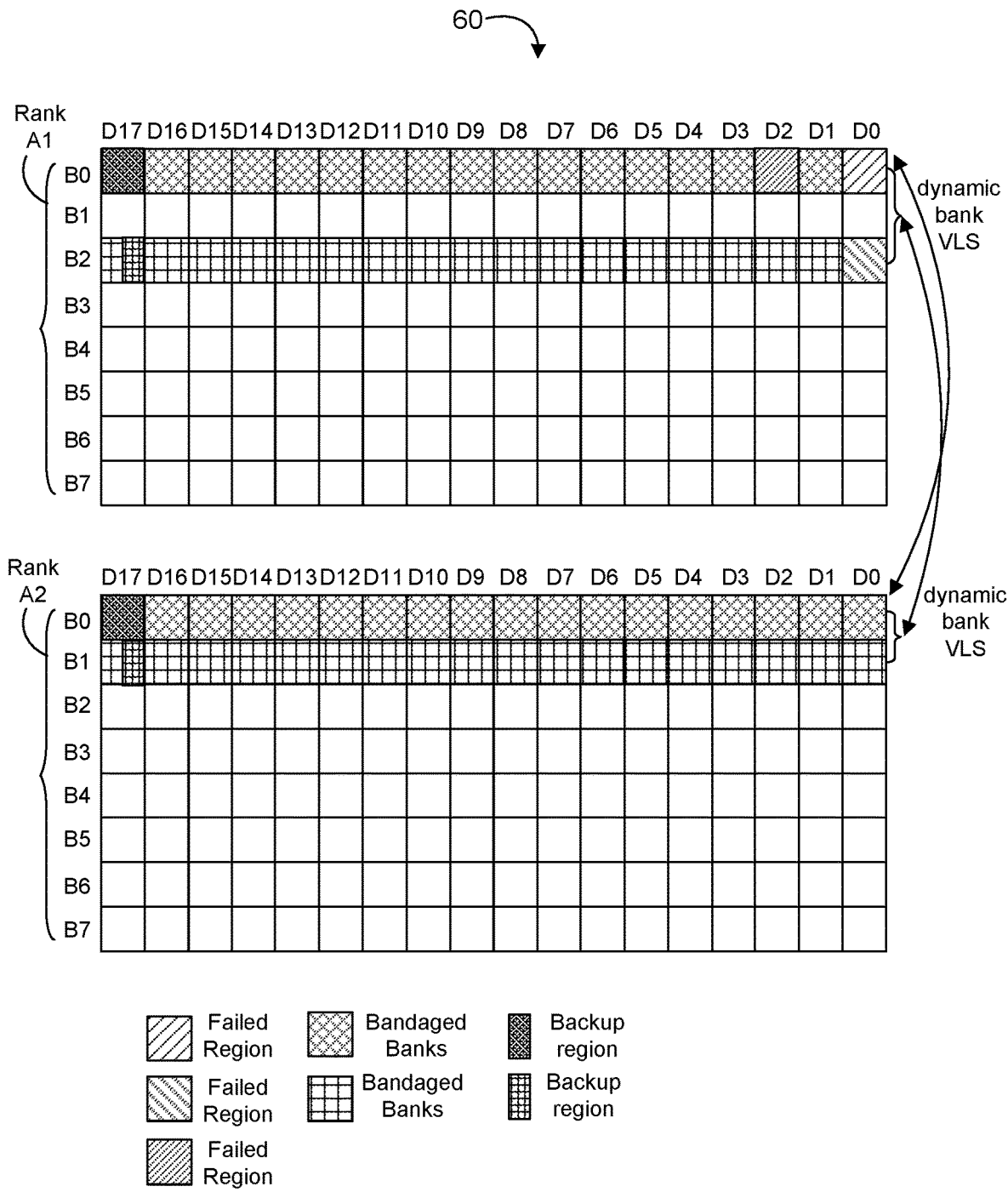

With reference to FIG. 7, a third failure happens in bank B0, rank A1, device D2 of the memory 60 (e.g., the third failure is in a different device and already failed bank as a previous failure). Bank B0 already has a failure in device D0, so the memory controller will construct another dynamic bank VLS for SDDC and all device D17 backup regions in bank B0, rank A1 and bank B0, rank A2 are used for device data protection. As shown in Table 8, the memory controller adds an entry to the data structure such that two region registers are used to store the VLS information. Bank B0 changes to State N2 because the device D2 is the second failed device in bank B0.

TABLE 8

| FIELD | VALUE | VALUE |
| --- | --- | --- |
| Region register | 0 | 1 |
| Failed rank | A1 | A1 |
| Failed bank group | B0, B2 | B0 |
| Failed device | D0 | D2 |
| Non-failed rank | A2 | A2 |
| Non-failed bank group | B0, B1 | B0 |

Figure 8:
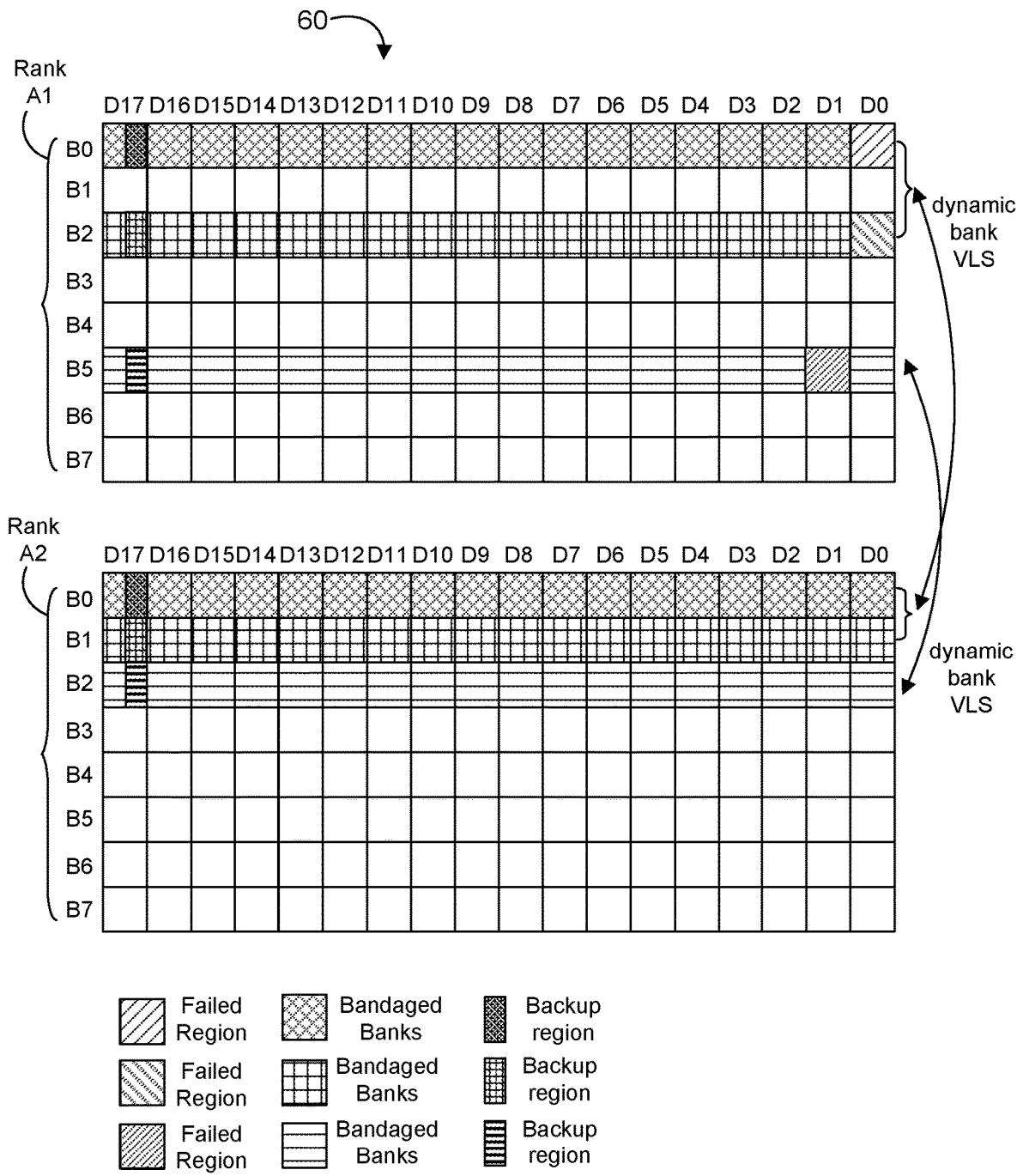

With reference to FIG. 8, a third memory happens in bank B5, rank A1, device D1 of the memory 60 (e.g., the third failure is in a different device and non-failed bank as a previous failure). Another dynamic bank VLS is triggered for bank B5. The memory controller finds a non-failed buddy region in bank B2, rank A2, and the buddy bank B2 is bandaged with bank B5. Bank B5 changes to state N1. The memory controller then adds an entry to the data structure such that two region registers are used to store the VLS information as shown in Table 9.

TABLE 9

| FIELD | VALUE | VALUE |
| --- | --- | --- |
| Region register | 0 | 1 |
| Failed rank | A1 | A1 |
| Failed bank group | B0, B2 | B5 |
| Failed device | D0 | D1 |
| Non-failed rank | A2 | A2 |
| Non-failed bank group | B0, B1 | B2 |

The foregoing provides a detailed description of how dynamic bank ADDDC works with three example memory failure situations. However, those skilled in the art will appreciate that the system may successfully recover from more than three memory failures. Embodiments of the system may keep running until a bank changes from state N2 to requiring a system call. An embodiment of dynamic bank ADDDC with 16 banks in a rank and 8 region registers in total may exhibit significantly increased memory failure handling as compared to conventional ADDDC.

Adaptive Multiple Device DDC Examples

Some embodiments may advantageously provide technology for adaptive multiple device data correction (AMDDC) for memory failure correction. As noted above, DDC technology may refer to a RAS feature on a server platform. For example, DDC technology may replace a failed memory region with a backup memory ECC region. Then the server can keep running by sacrificing part of the error-correcting performance. Some conventional data correcting techniques include single device data correction (SDDC) and adaptive double device data correction (ADDDC), that can handle failures in one and two devices of a bank or rank, respectively. Some embodiments provide AMDDC technology to handle more than two memory failures in different devices of a bank or rank. In some systems, a rank may also be a "half rank," and the term rank as used herein also covers such half ranks. Advantageously, embodiments may improve system RAS and further reduce the server downtime.

For conventional SDDC, the failed memory region is simply replaced with the region in an ECC device (e.g., D17) in the same bank. For example, a dual in-line memory module (DIMM) may be divided into several ranks in rows or several devices in columns A rank may be further divided into many banks. A memory region may then be identified a rank, bank, and device. If a failure happens in bank B0, device D0 in a rank, SDDC will remove bank B0, device D0 and replace it with bank B0, device D17, such that data that used to be written into D0 will now be written into D17 instead. After SDDC, the system cannot handle another failure in bank B0. If a second failure happens in bank B0, device D1, a system call will be triggered and might lead to server downtime.

For conventional ADDDC, the bank/rank with a failed region will bandage with a non-failed buddy bank/rank via VLS, as discussed above. Then data written to a failed region will instead be written to device D17 of both the failed rank and the buddy rank. If a first memory failure happens in rank A1, bank B0, device D0, a bank VLS is triggered and the failed region is bandaged with rank A2, bank B0. Half of each of the devices D17 of rank A1 and A2 are used to store data from the failed bank in device D0. If a second failure happens in rank A1, bank B0, device D2, then there is another bank VLS to replace the failed bank in device D2 with the backup devices D17 and the whole device D17 in both ranks becomes occupied. If there is a third failure in bank B0, the system cannot handle it. The VLS region information, which includes failed rank, failed bank, failed device, non-failed rank, non-failed bank and VLS level, is stored in region registers. Each VLS will occupy one region register. If all region registers are used, ADDDC cannot further handle the failures. A memory controller for a conventional DIMM may designate only two ranks and include only two region registers. Accordingly, data correction from such a conventional memory controller can only handle two failures at most in a bank/rank.

Some embodiments may provide technology to overcome one or more of the foregoing problems. In particular, some embodiments may provide AMDDC technology that can handle continuous (e.g., at least 4) memory failures in different devices in a bank or rank by VLS. Some embodiments provide technology to extend data correction technology from double devices to multiple devices. An embodiment of a memory controller may be configured to continue to find a buddy region for three or more failed devices in a bank or rank. Embodiments of AMDDC may extend ADDDC technology for either/both bank-level VLS and/or rank-level VLS. Advantageously, some embodiments may improve the reliability, availability, and serviceability of server platform, let the system successfully recover from more memory failures, and/or reduce the server crash probability and downtime cost for users.

AMDDC bank-level VLS Examples

Figure 9:
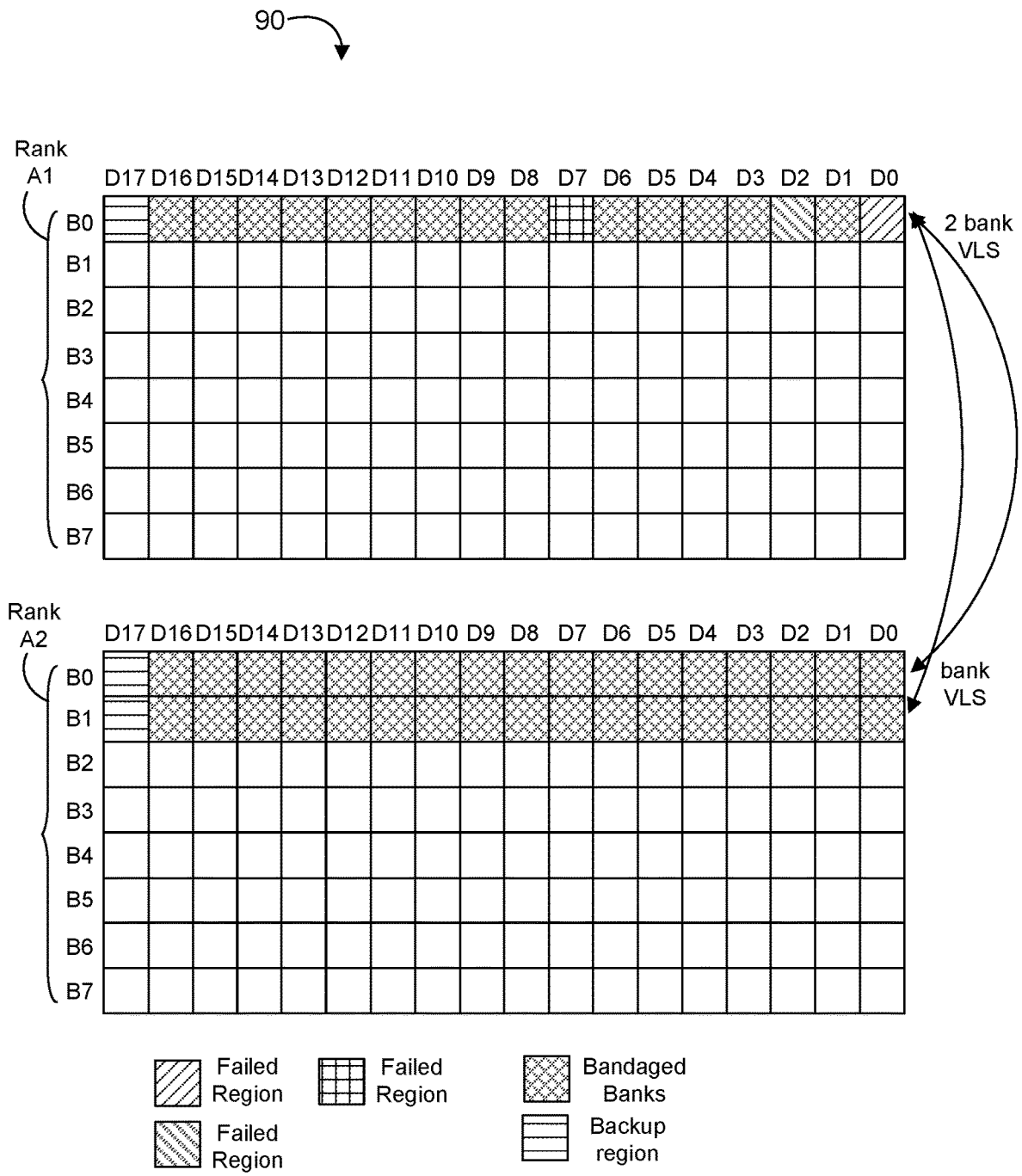
FIGS. 9 to 10 are illustrative diagrams of examples of bank-level adaptive multiple device data correction according to an embodiment.

With reference to FIG. 9, an embodiment of a memory system 90 illustrates an example of AMDDC for bank-level VLS. As shown in FIG. 9, first and second memory failures previously happened in memory regions with rank A1, bank B0, and devices D0 and D2, and an embodiment of a memory bandaged the failed regions with a non-failed buddy bank B0 in a non-failed rank A2. Then a third memory failure happens in a bank with the two different previously failed devices. In the illustrated example, the third failure happens in rank A1, bank B0, device D7. The memory controller with AMDDC technology will then determine if a clean bank and a region register are available, identify the clean bank as the buddy non-failed bank (e.g., rank A2, bank B1), and construct another pair of bank-level VLS between the failed memory region and the identified buddy non-failed bank. Data that was to be written to rank A1, bank B0, device D7 will instead be written to rank A2, bank B1, device D17. Table 10 shows the updated region register information.

TABLE 10

| FIELD | VALUE | VALUE | VALUE |
| --- | --- | --- | --- |
| Region register | 0 | 1 | 2 |
| Failed rank | A1 | A1 | A1 |
| Failed bank | B0 | B0 | B0 |
| Failed device | D0 | D2 | D7 |
| Non-failed rank | A2 | A2 | A2 |
| Non-failed bank | B0 | B0 | B1 |
| VLS level | bank | bank | bank |

Figure 10:
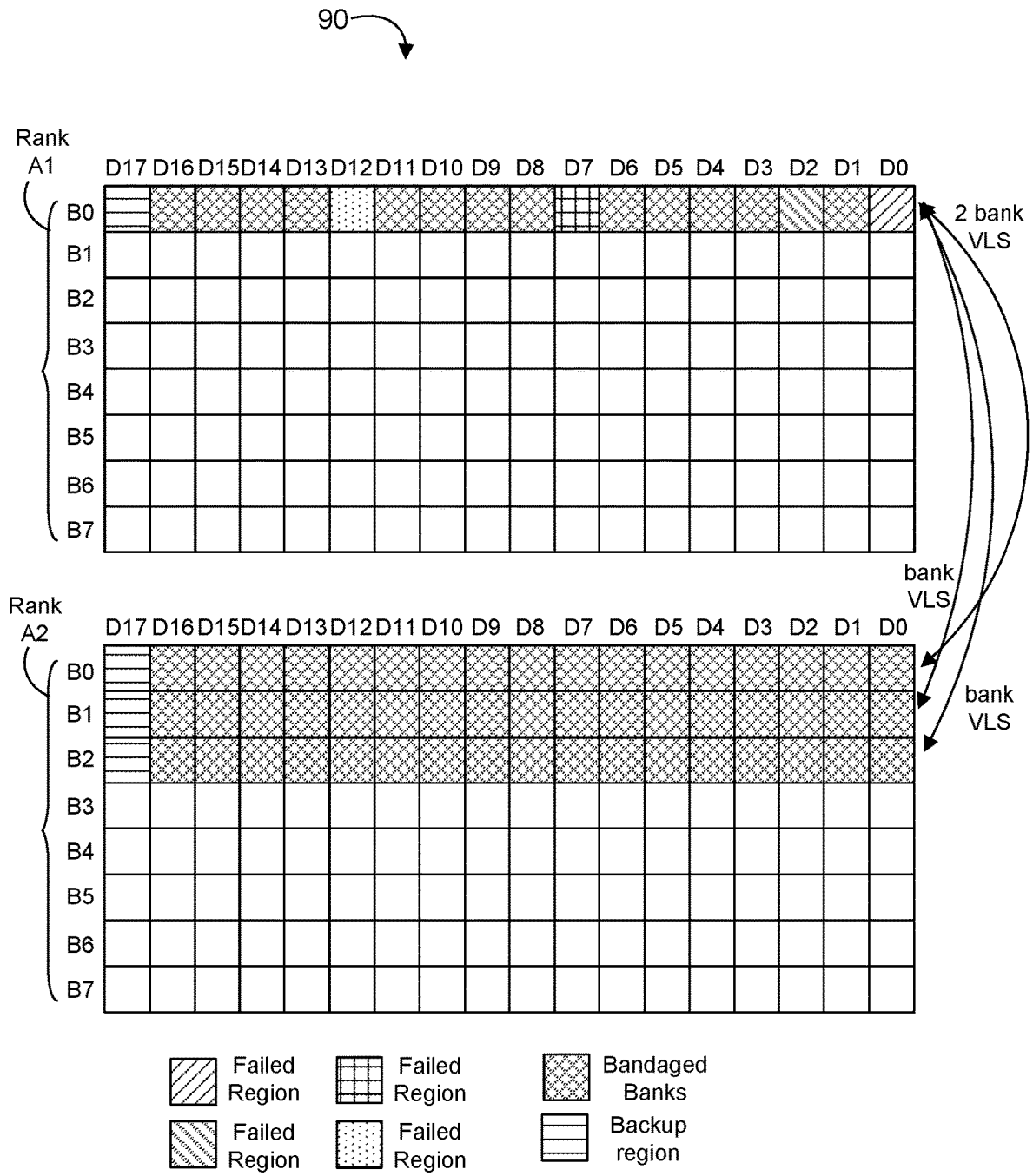

With reference to FIG. 10, an embodiment of the memory system 90 illustrates another example of AMDDC for bank-level VLS. If a fourth memory failure continues triggering in the same bank (e.g., rank A1, bank B0, device D12), the memory controller with AMDDC technology will then determine if a clean bank and a region register are available, identify the clean bank as the buddy non-failed bank (e.g., rank A2, bank B2), and another bank VLS is constructed. The updated region register information is shown in Table 11. Advantageously, embodiments of AMDDC technology can handle further memory region failures until all of the region registers are used or there is no clean bank.

TABLE 11

| FIELD | VALUE | VALUE | VALUE | VALUE |
|---|---|---|---|---|
| Region register | 0 | 1 | 2 | 3 |
| Failed rank | A1 | A1 | A1 | A1 |
| Failed bank | B0 | B0 | B0 | B0 |
| Failed device | D0 | D2 | D7 | D12 |
| Non-failed rank | A2 | A2 | A2 | A2 |
| Non-failed bank | B0 | B0 | B1 | B2 |
| VLS level | bank | bank | bank | bank |

AMDDC Rank-Level VLS Examples

Figure 11:
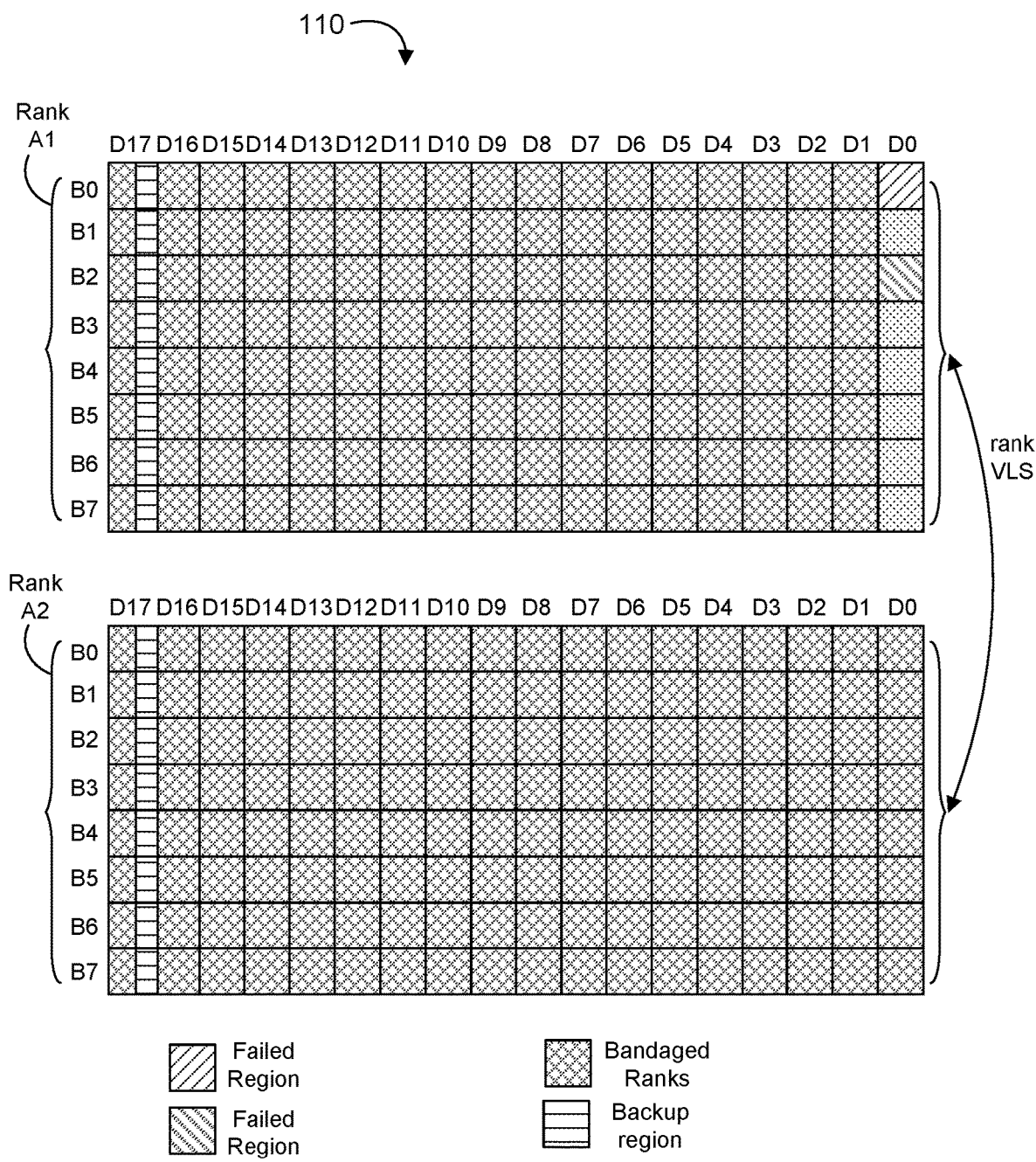
FIGS. 11 to 13 are illustrative diagrams of examples of rank-level adaptive multiple device data correction according to an embodiment.

With reference to FIG. 11, an embodiment of a memory system 110 illustrates an example of AMDDC for rank-level VLS. Failures in two memory regions in the same device (e.g., D0) and different banks (e.g., B0 and B2) of rank A1 trigger a rank-level VLS between rank A1 and A2, with the region register information as shown in Table 12.

TABLE 12

| FIELD | VALUE |
|---|---|
| Region register | 0 |
| Failed rank | A1 |
| Failed bank | n/a |
| Failed device | D0 |
| Non-failed rank | A2 |
| Non-failed bank | n/a |
| VLS level | rank |

Figure 12:
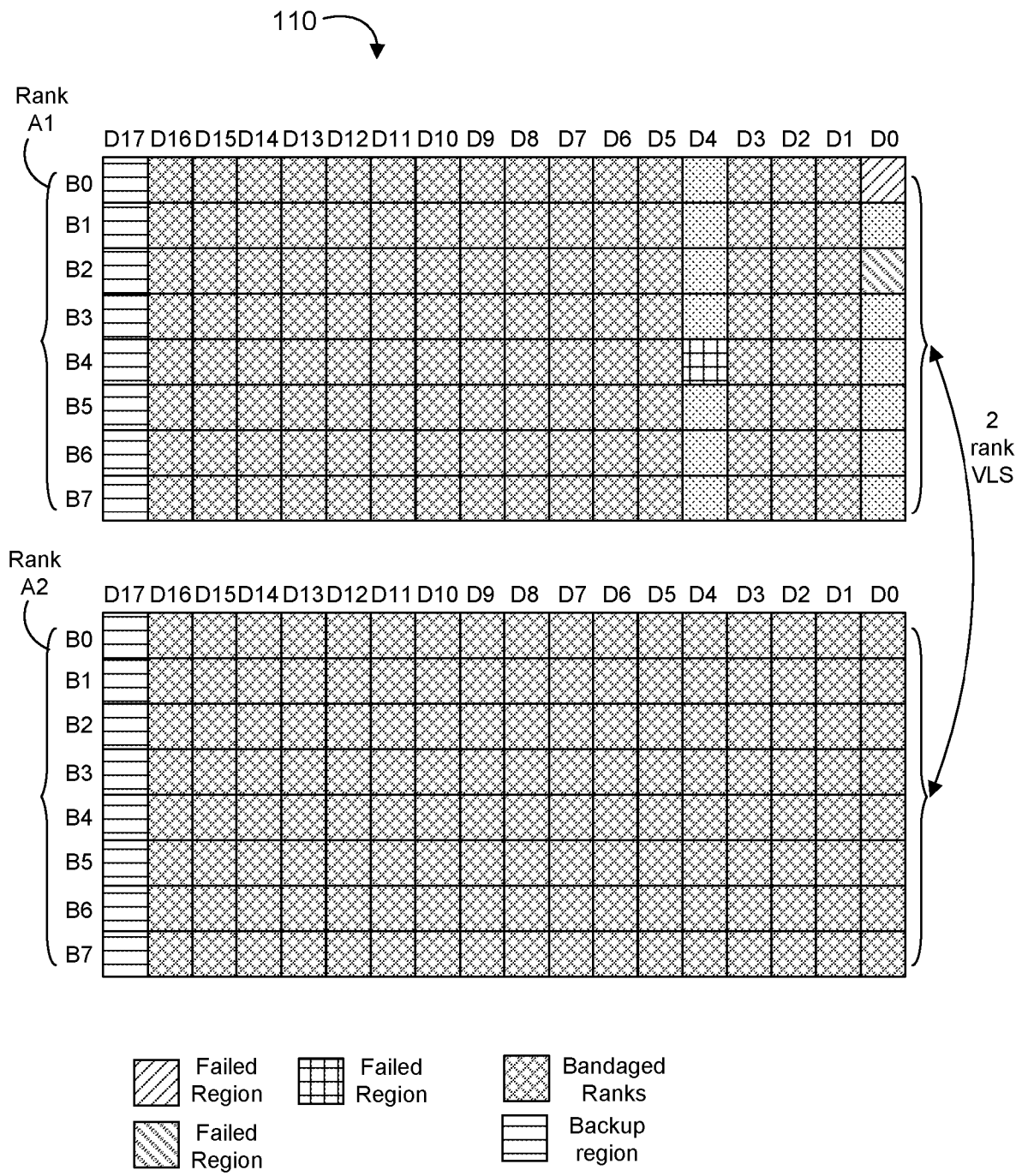

With reference to FIG. 12, an embodiment of the memory system 110 illustrates another example of AMDDC for rank-level VLS. If a third memory failure happens in rank A1, bank B4, device D4, the failure triggers a second rank-level VLS, with the region register information as shown in Table 13.

TABLE 13

| FIELD | VALUE | VALUE |
|---|---|---|
| Region register | 0 | 1 |
| Failed rank | A1 | A1 |
| Failed bank | n/a | n/a |
| Failed device | D0 | D4 |
| Non-failed rank | A2 | A2 |
| Non-failed bank | n/a | n/a |
| VLS level | rank | rank |

Figure 13:
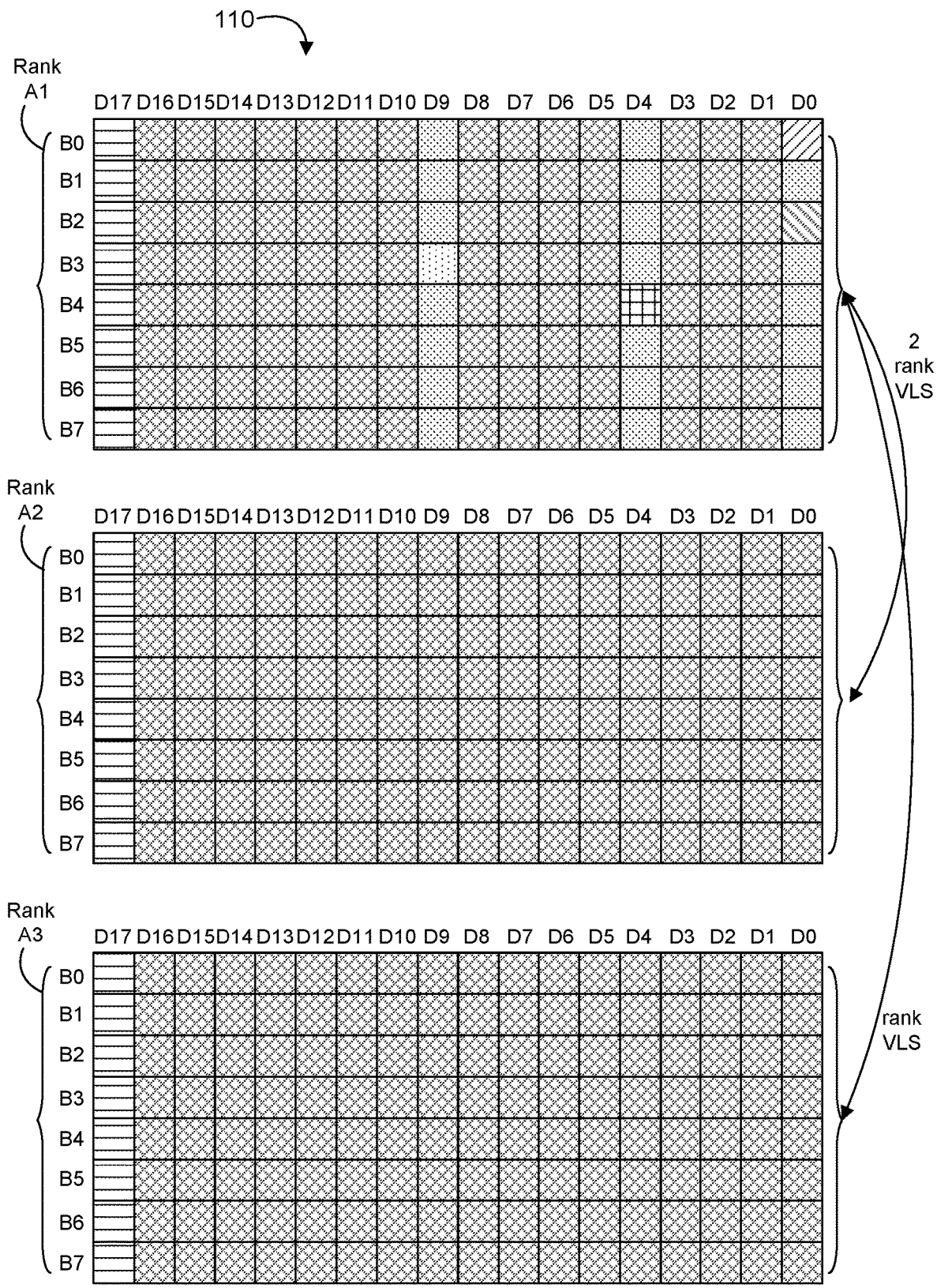

With reference to FIG. 13, an embodiment of the memory system 110 illustrates another example of AMDDC for rank-level VLS. Advantageously, embodiments of AMDDC technology can further handle memory region failures. If a fourth memory region failure happens in rank A1, bank B3, device D9, an embodiment of a memory controller will then determine if a clean rank and a region register are available, identify the clean rank as the buddy non-failed rank (e.g., rank A3), and construct another rank-level VLS between the failed memory region and the identified buddy non-failed rank, with the updated region register information as shown in Table 14. The system 110 can handle even more memory failures as long as a clean rank and a region register are available.

TABLE 14

| FIELD | VALUE | VALUE | VALUE |
|---|---|---|---|
| Region register | 0 | 1 | 2 |
| Failed rank | A1 | A1 | A1 |
| Failed bank | / | / | / |
| Failed device | D0 | D4 | D9 |
| Non-failed rank | A2 | A2 | A3 |
| Non-failed bank | / | / | / |
| VLS level | rank | rank | rank |

Figure 14:
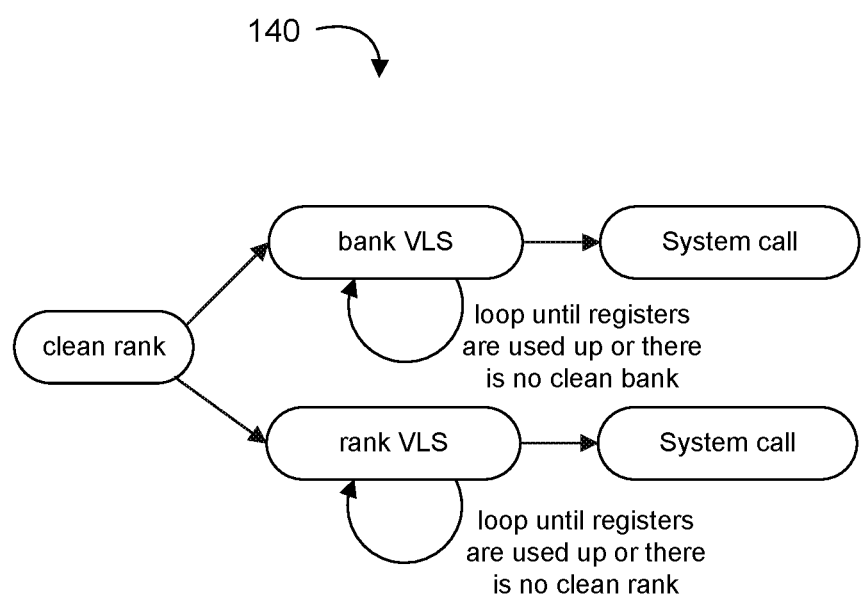
FIG. 14 is an illustrative diagram of another example of a state diagram according to an embodiment.

With reference to FIG. 14, an embodiment of a state diagram 140 for AMDDC starts with a clean rank and moves to either bank-level VLS or rank-level VLS. The bank-level VLS state loops until the region registers are all used up or there is no clean bank for VLS. The rank-level VLS state loops until the region registers are all used up or there is no clean rank for VLS. Advantageously, each of the bank-level VLS and rank-level VLS states include the loop routine, that enables an increased memory failure handling before moving to the system call state.

The technology discussed herein may be provided in various computing systems (e.g., including a non-mobile computing device such as a desktop, workstation, server, rack system, etc., a mobile computing device such as a smartphone, tablet, Ultra-Mobile Personal Computer (UMPC), laptop computer, ULTRABOOK computing device, smart watch, smart glasses, smart bracelet, etc., and/or a client/edge device such as an Internet-of-Things (IoT) device (e.g., a sensor, a camera, etc.)).

Figure 15:
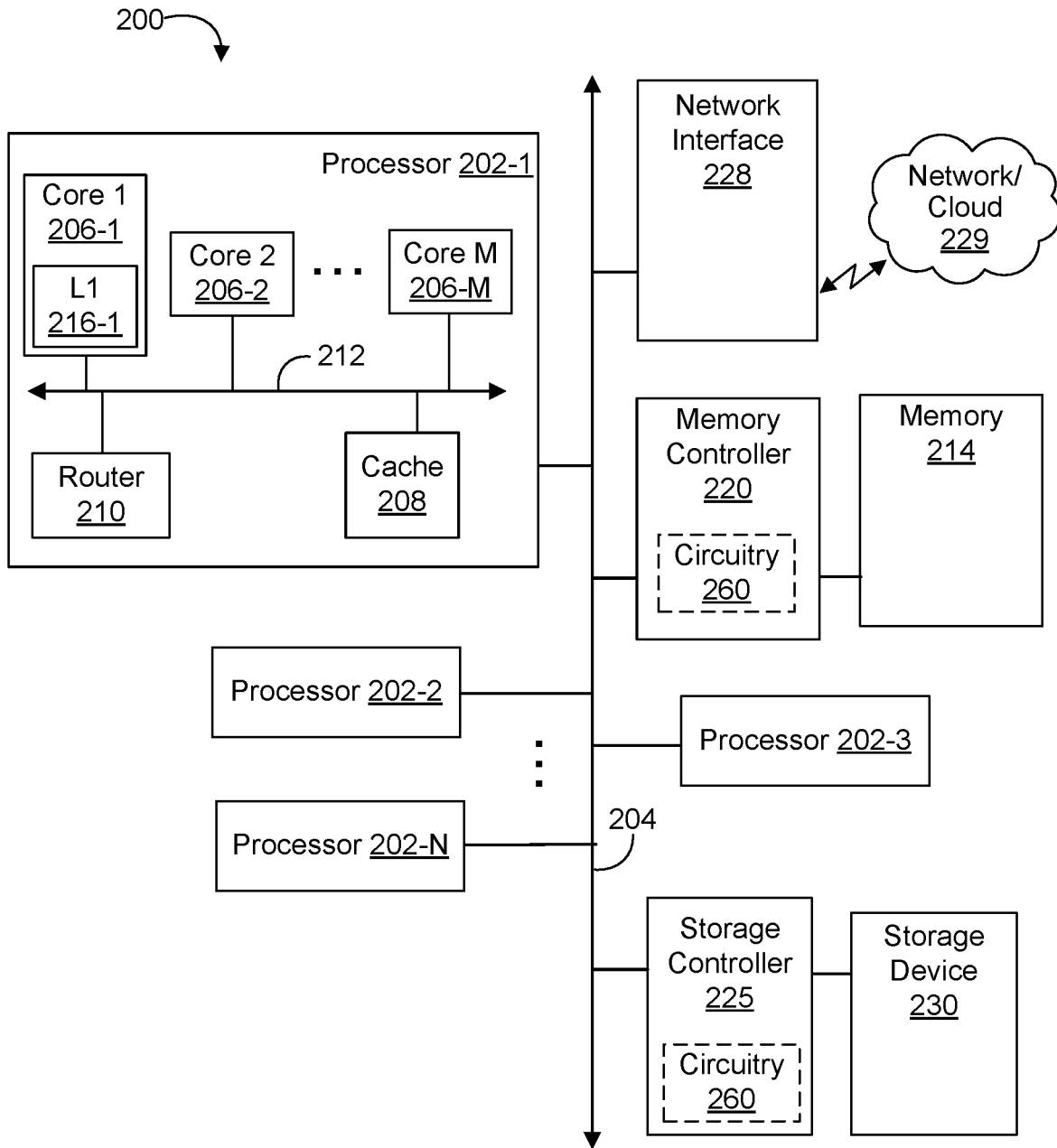
FIG. 15 is a block diagram of an example of a computing system according to an embodiment.

Turning now to FIG. 15, an embodiment of a computing system 200 may include one or more processors 202-1 through 202-N (generally referred to herein as "processors 202" or "processor 202"). The processors 202 may communicate via an interconnection or bus 204. Each processor 202 may include various components some of which are only discussed with reference to processor 202-1 for clarity. Accordingly, each of the remaining processors 202-2 through 202-N may include the same or similar components discussed with reference to the processor 202-1.

In some embodiments, the processor 202-1 may include one or more processor cores 206-1 through 206-M (referred to herein as "cores 206," or more generally as "core 206"), a cache 208 (which may be a shared cache or a private cache in various embodiments), and/or a router 210. The processor cores 206 may be implemented on a single integrated circuit (IC) chip. Moreover, the chip may include one or more shared and/or private caches (such as cache 208), buses or interconnections (such as a bus or interconnection 212), memory controllers, or other components.

In some embodiments, the router 210 may be used to communicate between various components of the processor 202-1 and/or system 200. Moreover, the processor 202-1 may include more than one router 210. Furthermore, the multitude of routers 210 may be in communication to enable data routing between various components inside or outside of the processor 202-1.

The cache 208 may store data (e.g., including instructions) that is utilized by one or more components of the processor 202-1, such as the cores 206. For example, the cache 208 may locally cache data stored in a memory 214 for faster access by the components of the processor 202. As shown in FIG. 15, the memory 214 may be in communication with the processors 202 via the interconnection 204. In some embodiments, the cache 208 (that may be shared) may have various levels, for example, the cache 208 may be a mid-level cache and/or a last-level cache (LLC). Also, each of the cores 206 may include a level 1 (L1) cache (216-1) (generally referred to herein as "L1 cache 216"). Various components of the processor 202-1 may communicate with the cache 208 directly, through a bus (e.g., the bus 212), and/or a memory controller or hub.

As shown in FIG. 15, memory 214 may be coupled to other components of system 200 through a memory controller 220. Memory 214 may include volatile memory and may be interchangeably referred to as main memory or system memory. Even though the memory controller 220 is shown to be coupled between the interconnection 204 and the memory 214, the memory controller 220 may be located elsewhere in system 200. For example, memory controller 220 or portions of it may be provided within one of the processors 202 in some embodiments. Alternatively, memory 214 may include byte-addressable non-volatile memory such as INTEL OPTANE technology.

The system 200 may communicate with other devices/systems/networks via a network interface 228 (e.g., which is in communication with a computer network and/or the cloud 229 via a wired or wireless interface). For example, the network interface 228 may include an antenna (not shown) to wirelessly (e.g., via an Institute of Electrical and Electronics Engineers (IEEE) 802.11 interface (including IEEE 802.11a/b/g/n/ac, etc.), cellular interface, 3G, 4G, LTE, BLUETOOTH, etc.) communicate with the network/cloud 229.

System 200 may also include a storage device such as a storage device 230 coupled to the interconnect 204 via storage controller 225. Hence, storage controller 225 may control access by various components of system 200 to the storage device 230. Furthermore, even though storage controller 225 is shown to be directly coupled to the interconnection 204 in FIG. 15, storage controller 225 can alternatively communicate via a storage bus/interconnect (such as the SATA (Serial Advanced Technology Attachment) bus, Peripheral Component Interconnect (PCI) (or PCI EXPRESS (PCIe) interface), NVM EXPRESS (NVMe), Serial Attached SCSI (SAS), Fiber Channel, CXL, etc.) with one or more other components of system 200 (for example where the storage bus is coupled to interconnect 204 via some other logic like a bus bridge, chipset, etc.) Additionally, storage controller 225 may be incorporated into memory controller logic or provided on a same integrated circuit (IC) device in various embodiments (e.g., on the same circuit board device as the storage device 230 or in the same enclosure as the storage device 230).

Furthermore, storage controller 225 and/or storage device 230 may be coupled to one or more sensors (not shown) to receive information (e.g., in the form of one or more bits or signals) to indicate the status of or values detected by the one or more sensors. These sensor(s) may be provided proximate to components of system 200 (or other computing systems discussed herein), including the cores 206, interconnections 204 or 212, components outside of the processor 202, storage device 230, SSD bus, SATA bus, storage controller 225, circuitry 260, etc., to sense variations in various factors affecting power/thermal behavior of the system/platform, such as temperature, operating frequency, operating voltage, power consumption, and/or inter-core communication activity, etc.

As shown in FIG. 15, features or aspects of the circuitry 260 may be distributed throughout the system 200, and/or co-located/integrated with various components of the system 200. Any aspect of the system 200 that may require or benefit from dynamic bank VLS DDC technology and/or AMDCC technology may include the circuitry 260. For example, the memory 214, the memory controller 220, the storage controller 225, and the network interface 228 may each include circuitry 260, which may be in the same enclosure as the system 200 and/or fully integrated on a printed circuit board (PCB) of the system 200. For example, the circuitry 260 may be configured to implement the dynamic bank VLS DDC technology and/or AMDCC technology aspects of the various embodiments. For example, the respective circuitry 260 may be configured to provide dynamic bank VLS DDC technology and/or AMDCC technology for the memory 214 and/or the storage device 230.

Advantageously, the circuitry 260 may include technology to implement one or more aspects of the system 10 (FIG. 1), the apparatus 15 (FIG. 2), the method 20 (FIGS. 3A to 3C), the state diagram 48 (FIG. 4), the memory 60 (FIGS. 5 to 8), the memory 90 (FIGS. 9 to 10), the memory 100 (FIGS. 11 to 13), the state diagram 140 (FIG. 14), and/or any of the dynamic bank VLS DDC and/or AMDCC features discussed herein. The system 200 may include further circuitry 260 and located outside of the foregoing components.

In some embodiments, the memory 214 may be organized as two or more ranks, where each rank is organized as two or more banks and two or more devices (e.g., as a matrix of banks and devices). The circuitry 260 may be configured to identify failed memory regions in the memory 214 by a rank, bank, and device associated with the failed memory region, and to provide recovery for failed memory regions in three or more banks of a first rank of the memory 214 or three or more devices of the first rank of the memory 214 by VLS DDC with one or more other ranks of the memory 214. In some embodiments of the system 200, the circuitry 260 may be configured to provide dynamic bank VLS DDC. For example, the circuitry 260 may be configured to maintain a data structure for the dynamic bank VLS DDC that includes a field for bank group information (e.g., that may indicate two or more banks in a bank group). In some embodiments, the circuitry 260 may be further configured to determine if a third or subsequent failed memory region in the first rank is in a same device and a different non-failed bank as a previously identified failed memory region and, if so determined, identify a non-failed bank in a second rank of the memory 214 and update the data structure to add a bank of the third or subsequent failed memory region and the identified non-failed bank to the bank group information for an entry in the data structure for the previously identified failed memory region.

The circuitry 260 may also be configured to determine if a third or subsequent failed memory region in the first rank is in a different device and an already failed bank as a previously identified failed memory region and, if so determined, set up DDC for the third or subsequent failed memory region in a backup memory region of both the first rank and a second rank of the memory 214, add an entry for the different device in the data structure, and update the data structure to add a bank of the third or subsequent failed memory region and a bank of the backup memory region to the bank group information for the added entry. The circuitry 260 may also be configured to determine if a third or subsequent failed memory region in the first rank is in a different device and non-failed bank as a previously identified failed memory region and, if so determined, identify a non-failed bank in a second rank of the memory 214, add an entry for the different device in the data structure, and update the data structure to add a bank of the third or subsequent failed memory region and the identified non-failed bank to the bank group information for the added entry.

In some embodiments, the circuitry 260 may be additionally or alternatively configured to provide adaptive multiple DDC for failed memory regions in four or more devices of the first rank of the memory 214 by VLS with one or more other ranks of the memory 214. In some cases, the failed memory regions may correspond to a same bank of the four or more devices. For example, the circuitry 260 may be configured to maintain a data structure for the adaptive multiple DDC that includes fields that indicate failed rank information and non-failed rank information. In some embodiments, the circuitry 260 may be further configured to determine if a clean bank is available for a bank-level VLS DDC and if the data structure can support an entry for DDC for a fourth or subsequent failed memory region and, if so determined, add an entry for the failed memory region in the data structure and update the data structure to indicate a failed rank, failed bank, and failed device of the fourth or subsequent failed memory region and a non-failed rank and non-failed bank of the clean bank. The circuitry 260 may also be configured to determine if a clean rank is available for a rank-level VLS DDC and if the data structure can support an entry for DDC for a fourth or subsequent failed memory region and, if so determined, add an entry for the failed memory region in the data structure and update the data structure to indicate a failed rank and failed device of the fourth or subsequent failed memory region and a non-failed rank of the clean rank.

Figure 16:
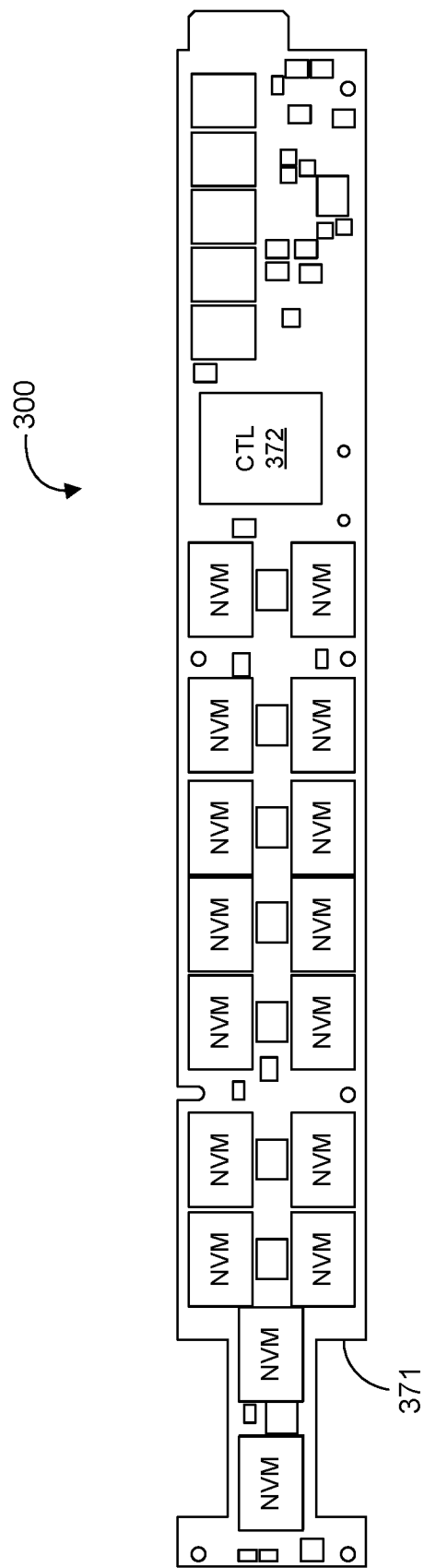
FIG. 16 is an illustrative top view of another example of a SSD according to an embodiment.

With reference to FIG. 16, an embodiment of a SSD 300 includes a PCB 371 with an E1.L standard form factor. The SSD 300 may be configured for performance clustered, bandwidth-optimized storage. FIG. 16 shows only one side of the SSD 300, with 16 packages of NVM ICs per side for a total of 32 NVM devices. The SSD 300 further includes a controller 372 with embodiments of technology for increased memory failure handling as described herein. For example, the 32 NVM devices may be organized in ranks, banks, and devices as described herein. The controller 372 may be configured to provide dynamic bank VLS DDC and/or AMDDC features as described herein.

Figure 17A:
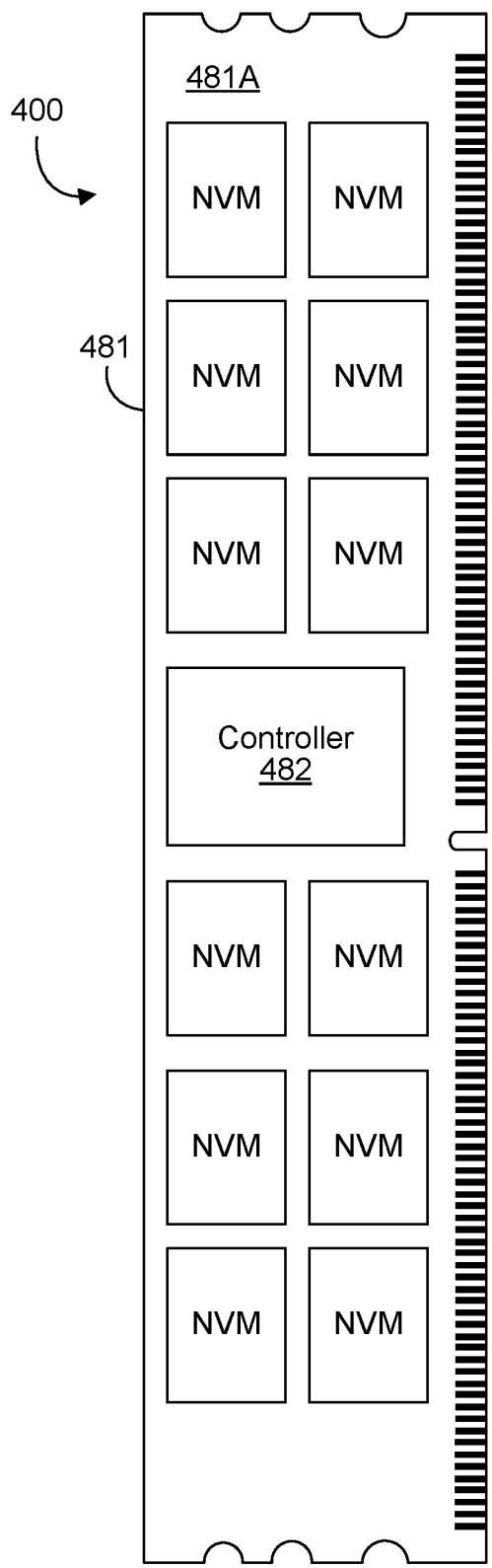
FIGS. 17A and 17B are illustrative top and bottom views of another example of a SSD according to an embodiment.
Figure 17B:
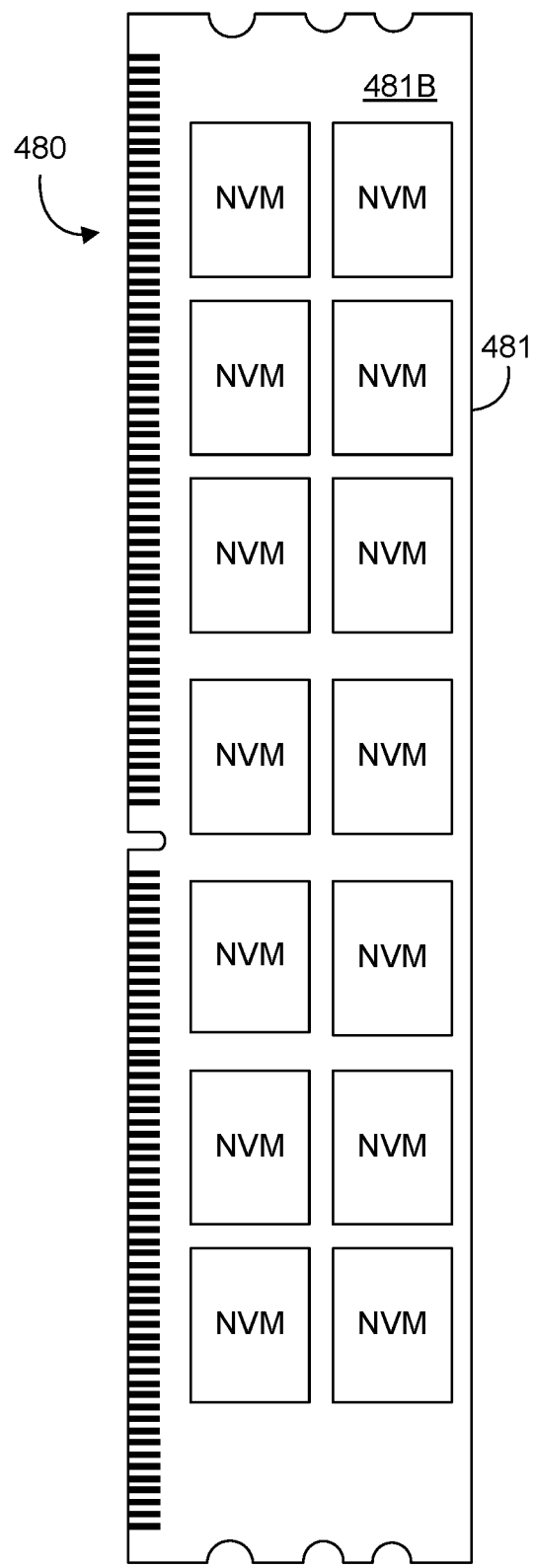

With reference to FIGS. 17A and 17B, an embodiment of a SSD 400 may include a PCB 481 with a DIMM form factor, including pins along both sides of a connector edge and components on both sides 481A and 481B of the DIMM. The number of pins shown in FIGS. 17A and 17B is for illustration purposes only, and more or fewer pins may be provided in various embodiments. The particular DIMM form factor shown in FIGS. 17A and 17B is for illustration purposes only, and other DIMM form factors may be provided in various embodiments. The SSD 400 may include additional components, circuitry, and logic to operate as a NVMe standards compliant SSD. For example, the SSD 400 may include, among other things, a controller 482 mounted on the PCB 481, interface component(s) including a communication interface, and a plurality of NVM devices mounted on the PCB 481. In accordance with some embodiments, the controller 482 includes technology for increased memory failure handling as described herein. For example, the NVM devices may be organized in ranks, banks, and devices as described herein. The controller 482 may be configured to provide dynamic bank VLS DDC and/or AMDDC features as described herein.

ADDITIONAL NOTES AND EXAMPLES

Example 1 includes an electronic apparatus, comprising one or more substrates, and a controller coupled to the one or more substrates, the controller including circuitry to identify failed memory regions in a memory by a rank, bank, and device associated with the failed memory region, and provide recovery for failed memory regions in three or more banks of a first rank of the memory or three or more devices of the first rank of the memory by virtual lock step device data correction with one or more other ranks of the memory.

Example 2 includes the apparatus of Example 1, wherein the circuitry is further to provide dynamic bank virtual lock step device data correction.

Example 3 includes the apparatus of Example 2, wherein the circuitry is further to maintain a data structure for the dynamic bank virtual lock step device data correction that includes a field for bank group information.

Example 4 includes the apparatus of Example 3, wherein the circuitry is further to determine if a third or subsequent failed memory region in the first rank is in a same device and a different non-failed bank as a previously identified failed memory region, and, if so determined identify a non-failed bank in a second rank of the memory, and update the data structure to add a bank of the third or subsequent failed memory region and the identified non-failed bank to the bank group information for an entry in the data structure for the previously identified failed memory region.

Example 5 includes the apparatus of any of Examples 3 to 4, wherein the circuitry is further to determine if a third or subsequent failed memory region in the first rank is in a different device and an already failed bank as a previously identified failed memory region, and, if so determined set up device data correction for the third or subsequent failed memory region in a backup memory region of both the first rank and a second rank of the memory, add an entry for the different device in the data structure, and update the data structure to add a bank of the third or subsequent failed memory region and a bank of the backup memory region to the bank group information for the added entry.

Example 6 includes the apparatus of any of Examples 3 to 4, wherein the circuitry is further to determine if a third or subsequent failed memory region in the first rank is in a different device and non-failed bank as a previously identified failed memory region, and, if so determined identify a non-failed bank in a second rank of the memory, add an entry for the different device in the data structure, and update the data structure to add a bank of the third or subsequent failed memory region and the identified non-failed bank to the bank group information for the added entry.

Example 7 includes the apparatus of any of Examples 1 to 6, wherein the circuitry is further to provide adaptive multiple device data correction for failed memory regions in four or more devices of the first rank of the memory by virtual lock step with one or more other ranks of the memory.

Example 8 includes the apparatus of Example 7, wherein the failed memory regions correspond to a same bank of the four or more devices.

Example 9 includes the apparatus of any of Examples 7 to 8, wherein the circuitry is further to maintain a data structure for the adaptive multiple device data correction that includes fields that indicate failed rank information and non-failed rank information.

Example 10 includes the apparatus of Example 9, wherein the circuitry is further to determine if a clean bank is available for a bank-level virtual lock step device data correction and if the data structure can support an entry for device data correction for a fourth or subsequent failed memory region and, if so determined add an entry for the failed memory region in the data structure, and update the data structure to indicate a failed rank, failed bank, and failed device of the fourth or subsequent failed memory region and a non-failed rank and non-failed bank of the clean bank.

Example 11 includes the apparatus of any of Examples 9 to 10, wherein the circuitry is further to determine if a clean rank is available for a rank-level virtual lock step device data correction and if the data structure can support an entry for a fourth or subsequent failed memory region and, if so determined add an entry for the failed memory region in the data structure, and update the data structure to indicate a failed rank and failed device of the fourth or subsequent failed memory region and a non-failed rank of the clean rank.

Example 12 includes an electronic system, comprising memory organized as two or more ranks, where each rank is organized as two or more banks and two or more devices, and a controller communicatively coupled to the memory, the controller including circuitry to identify failed memory regions in the memory by a rank, bank, and device associated with the failed memory region, and provide recovery for failed memory regions in three or more banks of a first rank of the memory or three or more devices of the first rank of the memory by virtual lock step device data correction with one or more other ranks of the memory.

Example 13 includes the system of Example 12, wherein the circuitry is further to provide dynamic bank virtual lock step device data correction.

Example 14 includes the system of Example 13, wherein the circuitry is further to maintain a data structure for the dynamic bank virtual lock step device data correction that includes a field for bank group information.

Example 15 includes the system of Example 14, wherein the circuitry is further to determine if a third or subsequent failed memory region in the first rank is in a same device and a different non-failed bank as a previously identified failed memory region, and, if so determined identify a non-failed bank in a second rank of the memory, and update the data structure to add a bank of the third or subsequent failed memory region and the identified non-failed bank to the bank group information for an entry in the data structure for the previously identified failed memory region.

Example 16 includes the system of any of Examples 14 to 15, wherein the circuitry is further to determine if a third or subsequent failed memory region in the first rank is in a different device and an already failed bank as a previously identified failed memory region, and, if so determined set up device data correction for the third or subsequent failed memory region in a backup memory region of both the first rank and a second rank of the memory, add an entry for the different device in the data structure, and update the data structure to add a bank of the third or subsequent failed memory region and a bank of the backup memory region to the bank group information for the added entry.

Example 17 includes the system of any of Examples 14 to 16, wherein the circuitry is further to determine if a third or subsequent failed memory region in the first rank is in a different device and non-failed bank as a previously identified failed memory region, and, if so determined identify a non-failed bank in a second rank of the memory, add an entry for the different device in the data structure, and update the data structure to add a bank of the third or subsequent failed memory region and the identified non-failed bank to the bank group information for the added entry.

Example 18 includes the system of any of Examples 12 to 17, wherein the circuitry is further to provide adaptive multiple device data correction for failed memory regions in four or more devices of the first rank of the memory by virtual lock step with one or more other ranks of the memory.

Example 19 includes the system of Example 18, wherein the failed memory regions correspond to a same bank of the four or more devices.

Example 20 includes the system of any of Examples 18 to 19, wherein the circuitry is further to maintain a data structure for the adaptive multiple device data correction that includes fields that indicate failed rank information and non-failed rank information.

Example 21 includes the system of Example 20, wherein the circuitry is further to determine if a clean bank is available for a bank-level virtual lock step device data correction and if the data structure can support an entry for device data correction for a fourth or subsequent failed memory region and, if so determined add an entry for the failed memory region in the data structure, and update the data structure to indicate a failed rank, failed bank, and failed device of the fourth or subsequent failed memory region and a non-failed rank and non-failed bank of the clean bank.

Example 22 includes the system of any of Examples 20 to 21, wherein the circuitry is further to determine if a clean rank is available for a rank-level virtual lock step device data correction and if the data structure can support an entry for device data correction for a fourth or subsequent failed memory region and, if so determined add an entry for the failed memory region in the data structure, and update the data structure to indicate a failed rank and failed device of the fourth or subsequent failed memory region and a non-failed rank of the clean rank.

Example 23 includes a method, comprising identifying failed memory regions in a memory by a rank, bank, and device associated with the failed memory region, and providing recovery for failed memory regions in three or more banks of a first rank of the memory or three or more devices of the first rank of the memory by virtual lock step device data correction with one or more other ranks of the memory.

Example 24 includes the method of Example 23, further comprising providing dynamic bank virtual lock step device data correction.

Example 25 includes the method of Example 24, further comprising maintaining a data structure for the dynamic bank virtual lock step device data correction that includes a field for bank group information.

Example 26 includes the method of Example 25, further comprising determining if a third or subsequent failed memory region in the first rank is in a same device and a different non-failed bank as a previously identified failed memory region, and, if so determined identifying a non-failed bank in a second rank of the memory, and updating the data structure to add a bank of the third or subsequent failed memory region and the identified non-failed bank to the bank group information for an entry in the data structure for the previously identified failed memory region.

Example 27 includes the method of any of Examples 25 to 26, further comprising determining if a third or subsequent failed memory region in the first rank is in a different device and an already failed bank as a previously identified failed memory region, and, if so determined setting up device data correction for the third or subsequent failed memory region in a backup memory region of both the first rank and a second rank of the memory, adding an entry for the different device in the data structure, and updating the data structure to add a bank of the third or subsequent failed memory region and a bank of the backup memory region to the bank group information for the added entry.

Example 28 includes the method of any of Examples 25 to 27, further comprising determining if a third or subsequent failed memory region in the first rank is in a different device and non-failed bank as a previously identified failed memory region, and, if so determined identifying a non-failed bank in a second rank of the memory, adding an entry for the different device in the data structure, and updating the data structure to add a bank of the third or subsequent failed memory region and the identified non-failed bank to the bank group information for the added entry.

Example 29 includes the method of any of Examples 23 to 28, further comprising providing adaptive multiple device data correction for failed memory regions in four or more devices of the first rank of the memory by virtual lock step with one or more other ranks of the memory.

Example 30 includes the method of Example 29, wherein the failed memory regions correspond to a same bank of the four or more devices.

Example 31 includes the method of any of Examples 29 to 30, further comprising maintaining a data structure for the adaptive multiple device data correction that includes fields that indicate failed rank information and non-failed rank information.

Example 32 includes the method of Example 31, further comprising determining if a clean bank is available for a bank-level virtual lock step device data correction and if the data structure can support an entry for device data correction for a fourth or subsequent failed memory region and, if so determined adding an entry for the failed memory region in the data structure, and updating the data structure to indicate a failed rank, failed bank, and failed device of the fourth or subsequent failed memory region and a non-failed rank and non-failed bank of the clean bank.

Example 33 includes the method of any of Examples 31 to 32, further comprising determining if a clean rank is available for a rank-level virtual lock step device data correction and if the data structure can support an entry for device data correction for a fourth or subsequent failed memory region and, if so determined adding an entry for the failed memory region in the data structure, and updating the data structure to indicate a failed rank and failed device of the fourth or subsequent failed memory region and a non-failed rank of the clean rank.

Example 34 includes at least one non-transitory machine readable medium comprising a plurality of instructions that, in response to being executed on a computing device, cause the computing device to identify failed memory regions in a memory by a rank, bank, and device associated with the failed memory region, and provide recovery for failed memory regions in three or more banks of a first rank of the memory or three or more devices of the first rank of the memory by virtual lock step device data correction with one or more other ranks of the memory.

Example 35 includes the at least one non-transitory machine readable medium of Example 34, comprising a plurality of further instructions that, in response to being executed on the computing device, cause the computing device to provide dynamic bank virtual lock step device data correction.

Example 36 includes the at least one non-transitory machine readable medium of Example 35, comprising a plurality of further instructions that, in response to being executed on the computing device, cause the computing device to maintain a data structure for the dynamic bank virtual lock step device data correction that includes a field for bank group information.

Example 37 includes the at least one non-transitory machine readable medium of Example 36, comprising a plurality of further instructions that, in response to being executed on the computing device, cause the computing device to determine if a third or subsequent failed memory region in the first rank is in a same device and a different non-failed bank as a previously identified failed memory region, and, if so determined identify a non-failed bank in a second rank of the memory, and update the data structure to add a bank of the third or subsequent failed memory region and the identified non-failed bank to the bank group information for an entry in the data structure for the previously identified failed memory region.

Example 38 includes the at least one non-transitory machine readable medium of any of Examples 36 to 37, comprising a plurality of further instructions that, in response to being executed on the computing device, cause the computing device to determine if a third or subsequent failed memory region in the first rank is in a different device and an already failed bank as a previously identified failed memory region, and, if so determined set up device data correction for the third or subsequent failed memory region in a backup memory region of both the first rank and a second rank of the memory, add an entry for the different device in the data structure, and update the data structure to add a bank of the third or subsequent failed memory region and a bank of the backup memory region to the bank group information for the added entry.

Example 39 includes the at least one non-transitory machine readable medium of any of Examples 36 to 38, comprising a plurality of further instructions that, in response to being executed on the computing device, cause the computing device to determine if a third or subsequent failed memory region in the first rank is in a different device and non-failed bank as a previously identified failed memory region, and, if so determined identify a non-failed bank in a second rank of the memory, add an entry for the different device in the data structure, and update the data structure to add a bank of the third or subsequent failed memory region and the identified non-failed bank to the bank group information for the added entry.

Example 40 includes the at least one non-transitory machine readable medium of any of Examples 34 to 39, comprising a plurality of further instructions that, in response to being executed on the computing device, cause the computing device to provide adaptive multiple device data correction for failed memory regions in four or more devices of the first rank of the memory by virtual lock step with one or more other ranks of the memory.

Example 41 includes the at least one non-transitory machine readable medium of Example 40, wherein the failed memory regions correspond to a same bank of the four or more devices.

Example 42 includes the at least one non-transitory machine readable medium of any of Examples 40 to 41, comprising a plurality of further instructions that, in response to being executed on the computing device, cause the computing device to maintain a data structure for the adaptive multiple device data correction that includes fields that indicate failed rank information and non-failed rank information.

Example 43 includes the at least one non-transitory machine readable medium of Example 42, comprising a plurality of further instructions that, in response to being executed on the computing device, cause the computing device to determine if a clean bank is available for a bank-level virtual lock step device data correction and if the data structure can support an entry for device data correction for a fourth or subsequent failed memory region and, if so determined add an entry for the failed memory region in the data structure, and update the data structure to indicate a failed rank, failed bank, and failed device of the fourth or subsequent failed memory region and a non-failed rank and non-failed bank of the clean bank.

Example 44 includes the at least one non-transitory machine readable medium of any of Examples 42 to 43, comprising a plurality of further instructions that, in response to being executed on the computing device, cause the computing device to determine if a clean rank is available for a rank-level virtual lock step device data correction and if the data structure can support an entry for device data correction for a fourth or subsequent failed memory region and, if so determined add an entry for the failed memory region in the data structure, and update the data structure to indicate a failed rank and failed device of the fourth or subsequent failed memory region and a non-failed rank of the clean rank.

Example 45 includes a memory controller apparatus, comprising means for identifying failed memory regions in a memory by a rank, bank, and device associated with the failed memory region, and means for providing recovery for failed memory regions in three or more banks of a first rank of the memory or three or more devices of the first rank of the memory by virtual lock step device data correction with one or more other ranks of the memory.

Example 46 includes the apparatus of Example 45, further comprising means for providing dynamic bank virtual lock step device data correction.

Example 47 includes the apparatus of Example 46, further comprising means for maintaining a data structure for the dynamic bank virtual lock step device data correction that includes a field for bank group information.

Example 48 includes the apparatus of Example 47, further comprising means for determining if a third or subsequent failed memory region in the first rank is in a same device and a different non-failed bank as a previously identified failed memory region, and, if so determined means for identifying a non-failed bank in a second rank of the memory, and means for updating the data structure to add a bank of the third or subsequent failed memory region and the identified non-failed bank to the bank group information for an entry in the data structure for the previously identified failed memory region.

Example 49 includes the apparatus of any of Examples 47 to 48, further comprising means for determining if a third or subsequent failed memory region in the first rank is in a different device and an already failed bank as a previously identified failed memory region, and, if so determined means for setting up device data correction for the third or subsequent failed memory region in a backup memory region of both the first rank and a second rank of the memory, means for adding an entry for the different device in the data structure, and means for updating the data structure to add a bank of the third or subsequent failed memory region and a bank of the backup memory region to the bank group information for the added entry.

Example 50 includes the apparatus of any of Examples 47 to 49, further comprising means for determining if a third or subsequent failed memory region in the first rank is in a different device and non-failed bank as a previously identified failed memory region, and, if so determined means for identifying a non-failed bank in a second rank of the memory, means for adding an entry for the different device in the data structure, and means for updating the data structure to add a bank of the third or subsequent failed memory region and the identified non-failed bank to the bank group information for the added entry.

Example 51 includes the apparatus of any of Examples 45 to 50, further comprising means for providing adaptive multiple device data correction for failed memory regions in four or more devices of the first rank of the memory by virtual lock step with one or more other ranks of the memory.

Example 52 includes the apparatus of Example 51, wherein the failed memory regions correspond to a same bank of the four or more devices.

Example 53 includes the apparatus of any of Examples 51 to 52, further comprising means for maintaining a data structure for the adaptive multiple device data correction that includes fields that indicate failed rank information and non-failed rank information.

Example 54 includes the apparatus of Example 53, further comprising means for determining if a clean bank is available for a bank-level virtual lock step device data correction and if the data structure can support an entry for device data correction for a fourth or subsequent failed memory region and, if so determined means for adding an entry for the failed memory region in the data structure, and means for updating the data structure to indicate a failed rank, failed bank, and failed device of the fourth or subsequent failed memory region and a non-failed rank and non-failed bank of the clean bank.

Example 55 includes the apparatus of any of Examples 53 to 54, further comprising means for determining if a clean rank is available for a rank-level virtual lock step device data correction and if the data structure can support an entry for device data correction for a fourth or subsequent failed memory region and, if so determined means for adding an entry for the failed memory region in the data structure, and means for updating the data structure to indicate a failed rank and failed device of the fourth or subsequent failed memory region and a non-failed rank of the clean rank.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C. Various components of the systems described herein may be implemented in software, firmware, and/or hardware and/or any combination thereof. For example, various components of the systems or devices discussed herein may be provided, at least in part, by hardware of a computing SoC such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. An electronic apparatus, comprising:
   one or more substrates; and
   a controller coupled to the one or more substrates, the controller including circuitry to:
   perform an identification of a failed region of a memory, comprising the circuitry to identify a rank, a bank, and a device associated with the failed region;
   maintain a data structure based on the identification of the failed region, wherein the data structure is to identify:

29 a first bank group comprising one or more first banks which are each of a respective same rank, which are each of a first device, and which have each been identified as a respective failed bank, wherein a maximum possible number of the one or more first banks is greater than two; and a second bank group comprising one or more second banks which are each of a respective same rank, which are each of a second device, and which have each been identified as a respective non-failed bank, wherein a maximum possible number of the one or more second banks is greater than two, and wherein each of the one or more first banks is to correspond to a respective bank of the one or more second banks; and provide dynamic bank virtual lock step device data correction based on the data structure.

2. The apparatus of claim 1, wherein:
the circuitry to maintain the data structure based on the identification of the failed region comprises the circuitry to access an entry of the data structure;
the entry is to indicate a correspondence of the first bank group with the second bank group; and
the entry is to comprise:
a first field to provide a first list of the one or more first banks; and
a second field to provide a second list of the one or more second banks.

3. The apparatus of claim 2, wherein the entry is to omit any explicit identifier of a level of virtual lock step device data correction.

4. The apparatus of claim 1, wherein:
the circuitry to perform the identification of the failed region comprises the circuitry to determine that a third or subsequent failed memory region in a first rank is in a same device and a different non-failed bank as a previously identified failed memory region which corresponds to the data structure; and
the circuitry to maintain the data structure based on the identification comprises the circuitry to:
identify a non-failed bank in a second rank of the memory, and
update the data structure to add to the first bank group a bank of the third or subsequent failed memory region, and further to add to the second bank group the identified non-failed bank.

5. The apparatus of claim 1, wherein the circuitry is further to:
determine if a third or subsequent failed memory region in a first rank is in a different device and an already failed bank as a previously identified failed memory region; and, if so determined:
set up device data correction for the third or subsequent failed memory region in a backup memory region of both the first rank and a second rank of the memory,
add an entry for the different device in the data structure, and
update the data structure to add a bank of the third or subsequent failed memory region and a bank of the backup memory region to the bank group information for the added entry.

6. The apparatus of claim 1, wherein the circuitry is further to:
determine if a third or subsequent failed memory region in a first rank is in a different device and non-failed bank as a previously identified failed memory region; and, if so determined:

30 identify a non-failed bank in a second rank of the memory,
add an entry for the different device in the data structure, and
update the data structure to add a bank of the third or subsequent failed memory region and the identified non-failed bank to the bank group information for the added entry.

7. The apparatus of claim 1, wherein:
a first rank of the memory is to comprise the one or more first banks; and
the circuitry is further to provide adaptive multiple device data correction for failed memory regions in four or more devices of the first rank of the memory by virtual lock step with one or more other ranks of the memory.

8. The apparatus of claim 7, wherein:
the data structure is a first data structure; and
the circuitry is further to:
maintain a second data structure for the adaptive multiple device data correction, wherein the second data structure comprises fields that indicate failed rank information and non-failed rank information;
determine if a clean bank is available for a bank-level virtual lock step device data correction and if the second data structure can support an entry for device data correction for a fourth or subsequent failed memory region and, if so determined:
add an entry for the failed memory region in the second data structure, and
update the second data structure to indicate a failed rank, failed bank, and failed device of the fourth or subsequent failed memory region and a non-failed rank and non-failed bank of the clean bank.

9. An electronic system, comprising:
memory organized as two or more ranks, where each rank is organized as two or more banks and two or more devices; and
a controller communicatively coupled to the memory, the controller including circuitry to:
perform an identification of a failed region of the memory, comprising the circuitry to identify a rank, a bank, and a device associated with the failed region;
maintain a data structure based on the identification of the failed region, wherein the data structure is to identify:
a first bank group comprising one or more first banks which are each of a respective same rank, which are each of a first device, and which have each been identified as a respective failed bank, wherein a maximum possible number of the one or more first banks is greater than two; and
a second bank group comprising one or more second banks which are each of a respective same rank, which are each of a second device, and which have each been identified as a respective non-failed bank, wherein a maximum possible number of the one or more second banks is greater than two, and wherein each of the one or more first banks is to correspond to a respective bank of the one or more second banks; and
provide dynamic bank virtual lock step device data correction based on the data structure.

10. The system of claim 9, wherein;
the circuitry to maintain the data structure based on the identification of the failed region comprises the circuitry to access an entry of the data structure;

the entry is to indicate a correspondence of the first bank group with the second bank group; and the entry is to comprise:
  a first field to provide a first list of the one or more first banks; and
  a second field to provide a second list of the one or more second banks.

11. The system of claim 10, wherein the entry is to: omit any explicit identifier of a level of virtual lock step device data correction.

12. The system of claim 9, wherein:
a first rank of the memory is to comprise the one or more first banks; and
the circuitry is further to provide adaptive multiple device data correction for failed memory regions in four or more devices of the first rank of the memory by virtual lock step with one or more other ranks of the memory.

13. The system of claim 12, wherein the failed memory regions correspond to a same bank of the four or more devices.

14. The system of claim 12, wherein;
the data structure is a first data structure; and
the circuitry is further to:
  maintain a second data structure for the adaptive multiple device data correction, wherein the second data structure comprises fields that indicate failed rank information and non-failed rank information.

15. The system of claim 14, wherein the circuitry is further to:
determine if a clean bank is available for a bank-level virtual lock step device data correction and if the second data structure can support an entry for device data correction for a fourth or subsequent failed memory region and, if so determined:
  add an entry for the failed memory region in the second data structure, and
  update the second data structure to indicate a failed rank, failed bank, and failed device of the fourth or subsequent failed memory region and a non-failed rank and non-failed bank of the clean bank.

16. The system of claim 14, wherein the circuitry is further to:
determine if a clean rank is available for a rank-level virtual lock step device data correction and if the second data structure can support an entry for device data correction for a fourth or subsequent failed memory region and, if so determined:
  add an entry for the failed memory region in the second data structure, and
  update the second data structure to indicate a failed rank and failed device of the fourth or subsequent failed memory region and a non-failed rank of the clean rank.

17. A method, comprising:
performing an identification of a failed region of a memory, comprising identifying a rank, a bank, and a device associated with the failed region;
maintaining a data structure based on the identification of the failed region, wherein the data structure is to identify:
  a first bank group comprising one or more first banks which are each of a respective same rank, which are each of a first device, and which have each been identified as a respective failed bank, wherein a maximum possible number of the one or more first banks is greater than two; and
  a second bank group comprising one or more second banks which are each of a respective same rank, which are each of a second device, and which have each been identified as a respective non-failed bank, wherein a maximum possible number of the one or more second banks is greater than two, and wherein each of the one or more first banks is to correspond to a respective bank of the one or more second banks; and
providing dynamic bank virtual lock step device data correction based on the data structure.

18. The method of claim 17, wherein:
maintaining the data structure based on the identification of the failed region comprises accessing an entry of the data structure;
the entry is to indicate a correspondence of the first bank group with the second bank group; and
the entry is to comprise:
  a first field to provide a first list of the one or more first banks; and
  a second field to provide a second list of the one or more second banks.

19. The method of claim 17, wherein:
the data structure is a first data structure; and
the method further comprises:
  maintaining a second data structure for the adaptive multiple device data correction that includes fields that indicate failed rank information and non-failed rank information;
  determining if a clean bank is available for a bank-level virtual lock step device data correction and if the second data structure can support an entry for device data correction for a fourth or subsequent failed memory region and, if so determined:
    adding an entry for the failed memory region in the second data structure, and
    updating the second data structure to indicate a failed rank, failed bank, and failed device of the fourth or subsequent failed memory region and a non-failed rank and non-failed bank of the clean bank.

20. The method of claim 17, wherein:
the data structure is a first data structure; and
the method further comprises:
  maintaining a second data structure for the adaptive multiple device data correction that includes fields that indicate failed rank information and non-failed rank information;
  determining if a clean rank is available for a rank-level virtual lock step device data correction and if the second data structure can support an entry for device data correction for a fourth or subsequent failed memory region and, if so determined:
    adding an entry for the failed memory region in the second data structure, and
    updating the second data structure to indicate a failed rank and failed device of the fourth or subsequent failed memory region and a non-failed rank of the clean rank.

* * * * *